(12) United States Patent
Wilber

(10) Patent No.: US 9,367,288 B2
(45) Date of Patent: Jun. 14, 2016

(54) DEVICE AND METHOD RESPONSIVE TO INFLUENCES OF MIND

(75) Inventor: Scott A. Wilber, Gainesville, FL (US)

(73) Assignee: Psigenics Corporation, Gainesville, FL (US)

( * ) Notice: Subject to any disclaimer, the term of this patent is extended or adjusted under 35 U.S.C. 154(b) by 1909 days.

(21) Appl. No.: 12/312,570

(22) PCT Filed: Nov. 19, 2007

(86) PCT No.: PCT/US2007/024182

§ 371 (c)(1),
(2), (4) Date: May 16, 2009

(87) PCT Pub. No.: WO2008/066731

PCT Pub. Date: Jun. 5, 2008

(65) Prior Publication Data

US 2010/0057653 A1   Mar. 4, 2010
US 2013/0036078 A9   Feb. 7, 2013

Related U.S. Application Data

(60) Provisional application No. 60/860,736, filed on Nov. 22, 2006, provisional application No. 60/922,852, filed on Apr. 10, 2007.

(51) Int. Cl.
*G06F 7/58* (2006.01)

(52) U.S. Cl.
CPC .. *G06F 7/58* (2013.01); *G06F 7/588* (2013.01)

(58) Field of Classification Search
USPC .......................................... 706/45, 62, 15, 22
See application file for complete search history.

(56) References Cited

U.S. PATENT DOCUMENTS

| | | | | |
|---|---|---|---|---|
| 4,547,862 | A * | 10/1985 | McIver et al. | 708/404 |
| 6,223,083 | B1 * | 4/2001 | Rosar | 607/60 |
| 2002/0065580 | A1 * | 5/2002 | Derakhshan | 700/245 |
| 2003/0081804 | A1 * | 5/2003 | Kates | 381/316 |
| 2003/0139683 | A1 * | 7/2003 | Ryu et al. | 600/544 |
| 2004/0068199 | A1 * | 4/2004 | Echauz et al. | 600/544 |
| 2004/0146095 | A1 * | 7/2004 | Umeno et al. | 375/150 |

(Continued)

OTHER PUBLICATIONS

Tanaka et al, "OFDM Spreads to Broadband Communication", TechOn, Jun. 2002 Issue.*

(Continued)

*Primary Examiner* — Stanley K Hill
*Assistant Examiner* — Ilya Traktovenko
(74) *Attorney, Agent, or Firm* — Thomas Swenson

(57) ABSTRACT

An anomalous effect detector responsive to an influence of mind comprises a source of non-deterministic random numbers, SNDRN, a phase-sensitive filter and a results interface. In some embodiments, the phase-sensitive filter comprises a complex filter. An artificial sensory neuron comprises a SNDRN. Preferably, several artificial sensory neurons are grouped in a small volume. An analog artificial sensory detector comprises a plurality of analog artificial sensory neurons, an abstracting processor and a control or feedback unit. Some embodiments include an artificial neural network. An artificial consciousness network contains a plurality of artificial neural networks. One of the artificial neural networks comprises an activation pattern meta-analyzer. An artificial consciousness device comprises a cluster of artificial consciousness networks, a sensory input device to provide sensory input signals to the input of one or more ANNs in ACD, and an output device.

26 Claims, 12 Drawing Sheets

(56) References Cited

U.S. PATENT DOCUMENTS

| | | | | |
|---|---|---|---|---|
| 2004/0210156 | A1* | 10/2004 | Hogan | 600/545 |
| 2005/0090756 | A1* | 4/2005 | Wolf et al. | 600/546 |
| 2005/0131311 | A1* | 6/2005 | Leuthardt et al. | 600/545 |
| 2005/0144042 | A1* | 6/2005 | Joffe et al. | 705/2 |
| 2005/0159668 | A1* | 7/2005 | Kemere et al. | 600/544 |
| 2005/0197590 | A1* | 9/2005 | Osorio et al. | 600/544 |
| 2005/0261874 | A1* | 11/2005 | Deco et al. | 702/181 |
| 2005/0273890 | A1* | 12/2005 | Flaherty et al. | 901/50 |
| 2006/0165811 | A1* | 7/2006 | Black et al. | 424/570 |
| 2008/0183314 | A1 | 7/2008 | Klouzal et al. | |

OTHER PUBLICATIONS

Radin, "Neural Network Analyses of Consciousness-Related Patterns in Random Sequences", Journal of Scientific Exploration, vol. 7, No. 4, pp. 355-373, 1993.*

Yoo et. al, "Brain-computer interface using fMRI: spatial navigation by thoughts", Clinical Neuroscience, Neuroreport, vol. 15, No. 10, 2004.*

Thouless, "The Repeated Guessing Technique", International Journal of Parapsychology, 1960, pp. 21-36, vol. 2, No. 3.

Scott, "An Appendix to the Repeated Guesing Technique", International Journal of Parapsychology, 1960, pp. 37-45, vol. 2, No. 3.

Taetzch, "A Design of a Psi Communications System", International Journal of Parapsychology, 1962, pp. 35-66, vol. 4.

Jahn et al., "Mind/Machine Interaction Consortium: PortREG Replication Experiments", Journal of Scientific Exploration, 2000, pp. 499-555, vol. 14, No. 4.

Ibison, "Evidence that Anomalous Statistical Influence Depends on the Details of the Random Process", Journal of Scientific Exploration, 1998, pp. 407-423, vol. 12, No. 3.

Dobyns, "Overviw of Several Theoretical Models on PEAR Data", Journal of Scientific Exploration, 2000, pp. 163-194, vol. 14, No. 2.

Radin, "Enhancing Effects in Psi Experiments with Sequential Analysis: A Replication and Extension", European Journal of Parapsychology, 1990-91, vol. 8, pp. 98-111.

Puthoff et al., "Calculator-Assisted Psi-Amplification II", in Research in Psychology, D. Weiner et al., eds., Scarecrow Press, Metuchen, NJ, 1985, pp. 73-77.

Ryzl, "A Model of Parapsychological Communication", The Journal of Parapsychology, 1966, pp. 18-30, 30(1).

Kennedy, "Methods for Investigating Goal-Oriented PSI", The Journal of Parapsychology, 1995, pp. 47-62, vol. 59.

Carpenter, "Prediction of Forced-Choice ESP Performance", The Journal of Parapsychology, 1983, pp. 217-236, vol. 47.

Carpenter, "Prediction of Forced-Choice ESP Performance", The Journal of Parapsychology, 1991, pp. 227-280, vol. 55.

Brier et al., "PSI Application: Part I. A Preliminary Attempt", The Journal of Parapsychology, 1970, pp. 1-25, vol. 34, No. 1.

Brier et al., "PSI Application: Part II. The Majority Vote Technique—Analysis and Observations", The Journal of Parapsychology, 1970, pp. 26-36, vol. 34, No. 1.

Khrennivov, "Classical and Quantum Mechanics on Information Spaces with Applications to Cognitive, . . . Phenomena", Foundations of Physics, 1999, pp. 1065-1098, vol. 29, No. 7.

Utts, "An Assessment of the Evidence for Psychic Functioning", 1995, 22 pages, University of California, Davis, Division of Statistics.

Utts, "Replication and Meta-Analysis in Parapsychology", Statistical Science, 1991, pp. 363-378, vol. 6, No. 4.

Storm, "A Paradigm Shift Away from the ESP-pk Dichotomy: The Theory of Psychopraxia", The Journal of Parapsychology, 2000, pp. 279-297, vol. 64.

Atmanspacher et al., "Problems of Reproducibility in Complex Mind-Matter Systems", Journal of Scientific Exploration, 2003, pp. 243-270, vol. 17.

Atmanspacher et al., "Deviations from Physical Randomness Due to Human Agent Intention?", Chaos, Solitons, & Fractals, 1999, pp. 935-952, vol. 10.

Atmanspacher et al., "Investigating Deviations from Dynamical Randomness with Scaling Indices", Journal of Scientific Exploration, 2000, pp. 1-18, vol. 14, No. 1.

Radin et al., Evidence for Consciousness-Related Anomalies in Random Physical Systems, Foundations of Physics, 1989, pp. 1499-1514, vol. 19, No1 12.

Radin, "Neural Network Analysis of Consciousness-Related Patterns in Random Sequences", Society for Scientific Exploration,1993, pp. 355-373.

Jahn, "The Persistent Paradox of Psychic Phenomena: An Engineering Perspective", Proceedings of the IEEE, 1982, pp. 136-170, vol. 70, No. 2.

Radin, "Searching for 'Signatures' in Anomalous Human-Machine Interaction Data: A Neural Network Approach", J. of Scientific Exploration, 1989, pp. 185-200, vol. 3, No. 2.

Radin, Dean I et al., Towards a High Technology of the Mind: Rationale, Prototype Design and Initial Experiments, Mar. 13, 1991, Contel Technology Center, Chantilly, VA.

Steele, J.M., Random Walk and First Step Analysis, in Stochastic Calculus and Financial Applications, Karatzas, I. and Yor, M., editors, 2001, pp. 1-10, Springer-Verlag, New York, NY.

* cited by examiner

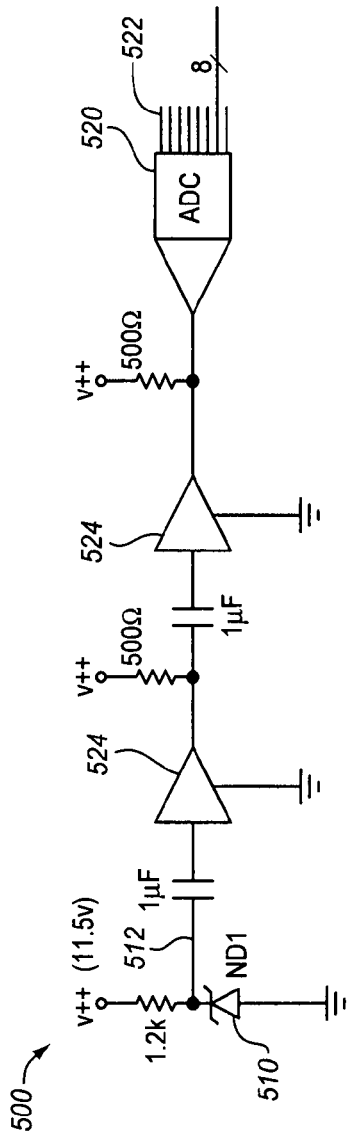
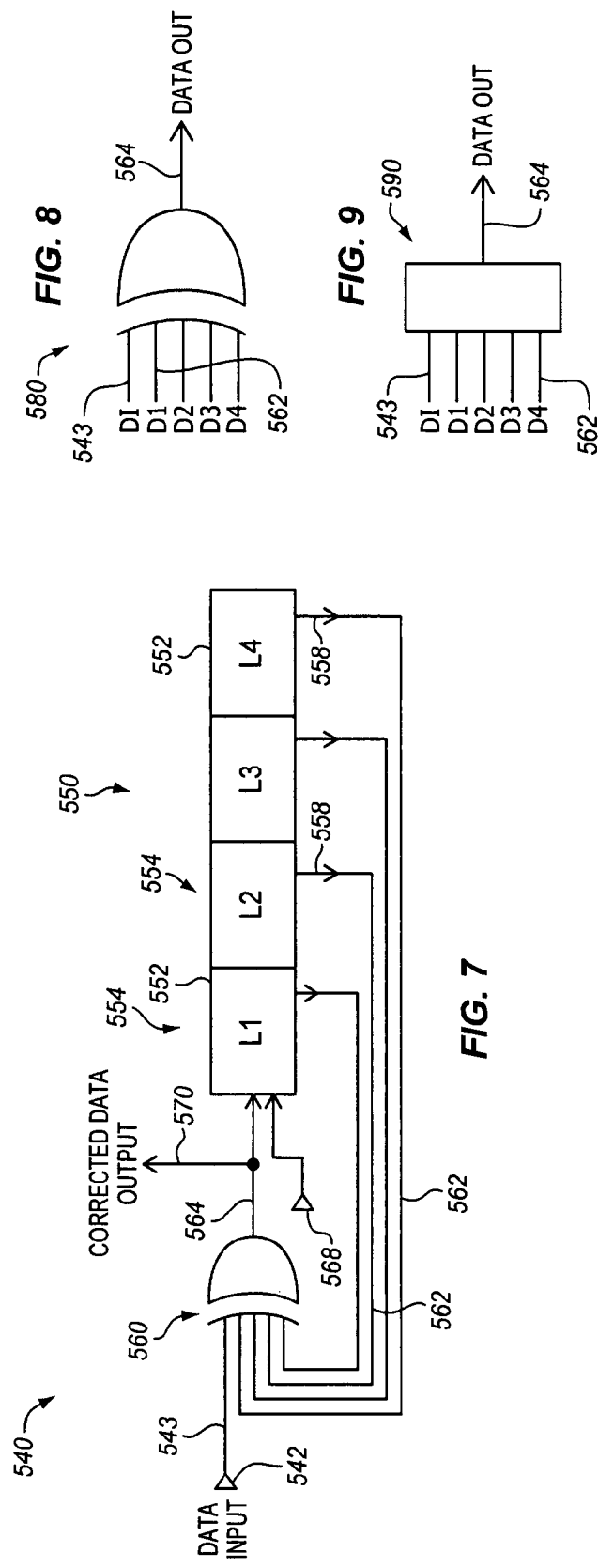

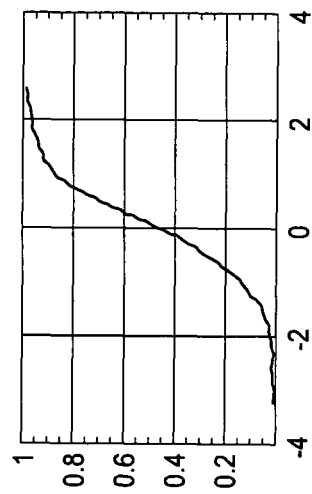
FIG. 28
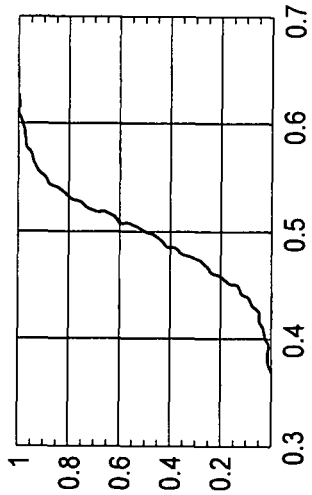
FIG. 27
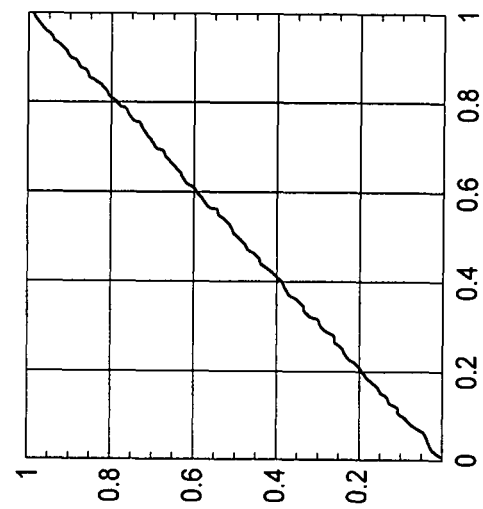
FIG. 29
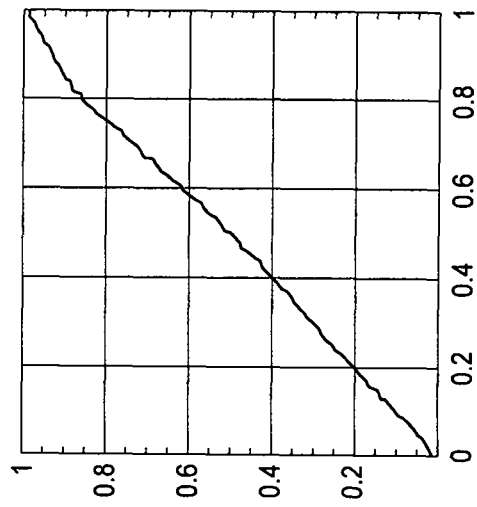
FIG. 31
FIG. 30

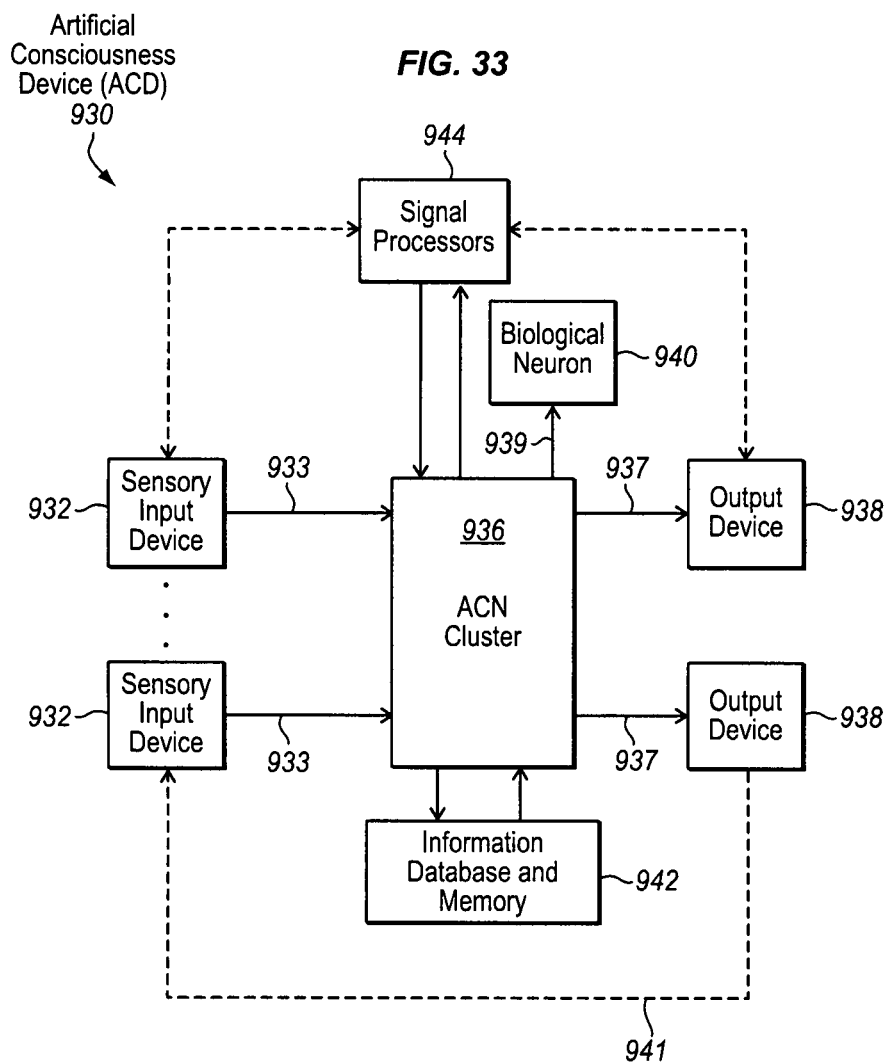

DEVICE AND METHOD RESPONSIVE TO INFLUENCES OF MIND

CROSS-REFERENCE TO RELATED APPLICATIONS

The present application is a national stage application under 35 U.S.C. 371 of international patent application number PCT/US2007/024182, filed Nov. 19, 2007, which claims the benefit of U.S. Provisional Application Ser. No. 60/860,736, filed Nov. 22, 2006, and claims the benefit of U.S. Provisional Application Ser. No. 60/922,852, filed Apr. 10, 2007.

TECHNICAL FIELD

The present invention relates to the field of information detection and transfer, and more specifically to a device and method responsive to influences of mind.

BACKGROUND ART

Devices for detecting direct mind-machine interaction (MMI) have been proposed and researched for many years. The most carefully controlled and best-explored experiments utilize some type of non-deterministic, or true, random number generator that produces a sequence of random numbers, usually in a binary form. The most common random number generators used are of the electronic type that produce a sequence of random binary bits.

In typical MMI experiments, a source of non-deterministic random numbers (SNDRN) is operated in conjunction with a human operator who attempts to influence the statistical properties of the SNDRN's output sequence. The operator, or subject, is directed to intend mentally the number of ones produced in the random sequence to be either higher, lower, or equal to the statistically expected number.

The results of these experiments, compiled over thousands of experimental trials, show a small but persistent and statistically significant effect. A most notable example of a research program for detecting MMI is the program known as Princeton Engineering Anomalies Research (PEAR) that ran for 27 years at Princeton University. This work is described in detail in the book *Margins of Reality, the Role of Mind in the Physical World*, by Robert Jahn and Brenda Dunne, Harcourt Brace and Company, 1987.

The PEAR lab and numerous other facilities around the world have established, to a very high level of statistical significance, the existence of a link between the mental intention of an operator and results of measurements of SNDRN output. Demonstrating the reality of MMI is of great scientific interest. Nevertheless, the laboratory demonstration did not immediately translate into useful devices or methods. Practical applications of MMI have not generally been achieved due to an absence of understanding of why or how the effect manifests, and because the experimental devices and data processing methods used were not sensitive enough to the effect.

Journal articles by many authors have suggested a variety of potential uses of MMI. These suggestions are made without disclosing means for their implementation. Apparatuses for experiments involving MMI have been complex and expensive. U.S. Pat. No. 5,830,064, issued Nov. 3, 1998, to Bradish et al, teaches a method and apparatus of generating values and detecting whether the values fall outside chance expectations. This patent involves converting some of the values according to a selection pattern in order to measure a collective statistical variance.

International Publication Number WO 2007/014031, published 1 Feb. 2007, teaches devices and methods for responding to influences of mind, including abstraction of patterns in numbers reflective of influences of mind.

During the last several decades, computer-related techniques involving artificial neural networks (ANNs) and artificial intelligence have been developed for such applications as data analysis, cognitive research and problem-solving. Conventional ANN and AC techniques are limited, however, because they are not responsive to an influence of mind.

DISCLOSURE OF INVENTION

The present invention alleviates some of the limitations mentioned above and improves the performance of MMI technology by providing devices, systems and methods for detecting and responding to an influence of mind by generating data that is correlated with intended or desired information, including hidden or non-inferable information, at high rates of speed and high accuracy.

Accordingly, objects and advantages of the present invention are:
to provide mental influence detectors and methods of detecting a mental influence to obtain useful information in an acceptable time period; to provide a mental influence detector device that is readily available at a low cost by making it accessible to individual users via the internet and by utilizing components available in the standard configuration of most personal computers; to provide a mental influence detector device that is hundreds of times more sensitive than previous devices; to bring embodiments of mental influence detectors and methods of using them into practical and common usage through greatly increased speed and reliability. In particular, some embodiments in accordance with the invention disclosed herein include one or more of a phase-sensitive filter, an artificial neural network (ANN), an artificial sensory neuron (ASN), an artificial consciousness device (ACD), and their combinations. Further objects and advantages are to provide mental influence detectors and methods that are widely available for experimentation and demonstration of influences of mind, thereby enhancing understanding and accelerating development of this valuable and untapped technology.

A basic embodiment of an anomalous effect detector responsive to an influence of mind comprises: a source of non-deterministic random numbers operable to generate source numbers; an abstracting processor operable to accept source numbers and to produce abstracted numbers; a phase-sensitive filter operable to accept abstracted numbers from the abstracting processor and to produce filter output numbers; and a results interface. In some embodiments, the source of non-deterministic random numbers is operable to generate digital source numbers; the abstracting processor is operable to accept digital source numbers and to produce digital abstracted numbers; and the phase-sensitive filter is operable to accept digital abstracted numbers from the abstracting processor and to produce quasi-continuous digital filter output numbers.

Another basic embodiment in accordance with the invention includes a source of non-deterministic random numbers operable to generate source numbers; a phase-sensitive filter operable to accept source numbers and to produce filter output numbers; an abstracting processor operable to accept filter output numbers and to produce abstracted numbers; and a results interface. In some embodiments, the source of non-deterministic random numbers is operable to generate digital source numbers; the phase-sensitive filter is operable to accept digital source numbers and to produce analog filter output numbers; and the abstracting processor is operable to accept analog filter output numbers and to produce analog abstracted numbers. In some embodiments, the abstracting processor comprises an artificial neural network. In some embodiments, the abstracting processor consists essentially of an artificial neural network. In some embodiments, the phase-sensitive filter comprises a complex filter, the complex filter being operable to produce real filter output numbers and imaginary filter output numbers.

Some embodiments comprise: a plurality of sources of non-deterministic random numbers (SNDRNs), each SNDRN operable to generate source numbers; a plurality of phase-sensitive filters; an abstracting processor; and a results interface; wherein each of a plurality of the phase-sensitive filters is operable to filter source numbers from one of the SNDRNs and to produce filter output numbers; and the abstracting processor is operable to receive filter output numbers from a plurality of the phase-sensitive filters and to produce abstracted numbers; and the results interface is operable to use the abstracted numbers. In some embodiments, the abstracting processor comprises an artificial neural network. In some embodiments,
the abstracting processor consists essentially of an artificial neural network. In some embodiments, the abstracting processor is operable to use a majority voting technique. In some embodiments, a phase-sensitive filter comprises a complex filter, the complex filter being operable to produce real filter output numbers and imaginary filter output numbers.

An artificial sensory neuron in accordance with the invention comprises: a source of non-deterministic random numbers operable to generate source numbers; and a filter selected from the group consisting of a phase-sensitive filter, a complex filter, and a low-pass filter. In some embodiments, the filter is operable to convert digital source numbers to analog source numbers.

An artificial sensory detector, ASD, responsive to an influence of mind, comprises: an artificial sensory neuron, the artificial sensory neuron comprising an analog source of non-deterministic random numbers, the artificial sensory neuron being operable to generate analog source numbers; and an analog ANN processor, the analog ANN processor being operable to abstract analog source numbers from the artificial sensory neuron to produce abstracted numbers indicative of an influence of mind. Some embodiments further comprise a control unit, the control unit being operable to provide a control signal. Some embodiments further comprise a feedback unit, the feedback unit being operable to provide feedback to an operator. Some embodiments comprise a plurality of ASNs. In some embodiments, a local cluster of ASNs is contained in a roughly spherical volume having a diameter in a range of about from 0.1 mm to 1.0 mm.

An artificial consciousness network, ACN, responsive to an influence of mind, comprises: an artificial sensory neuron (ASN), the ASN comprising a source of non-deterministic random numbers, the ASN being operable to generate source numbers; a sensory artificial neural network (sensory ANN), the sensory ANN being operable to process source numbers from an artificial sensory neuron to produce abstracted numbers indicative of an influence of mind; and a meta-analyzer artificial neural network (meta-analyzer ANN) comprising an activation pattern meta-analyzer, the meta-analyzer ANN being operable to accept abstracted numbers from a sensory ANN and to respond to a number of specific influences of mind operating on the ACN. In some embodiments, the ASN further comprises a low-pass filter, the low-pass filter being operable to change digital source numbers to quasi-continuous digital source numbers. Some embodiments comprise a plurality of artificial sensory neurons (ASNs), each ASN comprising a source of non-deterministic random numbers, each artificial sensory neuron being operable to generate source numbers; a plurality of sensory ANNs, each sensory ANN being operable to process source numbers from an ASN to produce abstracted numbers indicative of an influence of mind, and a meta-analyzer ANN comprising an activation pattern meta-analyzer, the meta-analyzer ANN being operable to accept abstracted numbers from a sensory ANN and to respond to a number of specific influences of mind operating on the ACN. In some embodiments, a local cluster of ASNs is contained in a roughly spherical volume having a diameter in a range of about from 0.1 mm to 1.0 mm. In some embodiments, a sensory ANN is operable to accept abstracted numbers from another sensory ANN.

An artificial consciousness device (ACD) responsive to an influence of mind comprises: a sensory input device, the sensory input device being operable to produce sensory signals; a cluster of a plurality of artificial consciousness networks (ACNs); and
an output device; wherein each ACN comprises: a sensory artificial neural network (sensory ANN), the sensory ANN being operable to accept ASN signals from the ASN and to produce sensory-ANN output numbers indicative of an influence of mind; and a meta-analyzer artificial neural network comprising an activation pattern meta-analyzer, the meta-analyzer ANN being operable to accept sensory-ANN output numbers from a sensory ANN and to produce an output responsive a number of states associated with consciousness operating on or in the ACN. In some embodiments, the SNDRN in the ASN is operable to generate digital source numbers; and the ASN comprises a low-pass filter operable to accept the digital source numbers and to produce quasi-continuous digital ASN signals. Some embodiments further comprise: a signal processor. Some embodiments further comprise: an information database and memory. Some embodiments comprise: a plurality of sensory input devices; a plurality of sensory ANNs in the cluster of ACNs, each sensory ANN being operable to process ASN signals from an ASN to produce abstracted numbers indicative of an influence of mind, and a plurality of meta-analyzer ANNs comprising an activation pattern meta-analyzer, a plurality of the meta-analyzer ANNs being operable to accept abstracted numbers from a plurality of sensory ANNs and to respond to a number of states associated with consciousness operating on or in the ACD. In some embodiments, a local cluster of ASNs is contained in a roughly spherical volume having a diameter in a range of about from 0.1 mm to 1.0 mm. In some embodiments, a sensory ANN in an ACN is operable to accept abstracted numbers from another sensory ANN in the ACN.

A basic method in accordance with the invention of responding to an influence of mind comprises: generating source numbers using a source of non-deterministic random numbers (SNDRN); abstracting the source numbers using an abstracting processor to produce abstracted numbers; filtering the abstracted numbers using a phase-sensitive filter to produce filter output numbers; and using the filter output numbers with a results interface. In some embodiments, generating source numbers from a SNDRN comprises generating digital source numbers; abstracting the source numbers to produce abstracted numbers comprises producing digital abstracted numbers; and filtering the abstracted numbers comprises filtering digital abstracted numbers and producing quasi-continuous digital filter output numbers. Some embodiments comprise: generating source numbers using a source of non-deterministic random numbers (SNDRN); filtering the source numbers using a phase-sensitive fitter to produce filter output numbers; abstracting the filter output numbers using an abstracting processor to produce abstracted numbers; and using the filter output numbers with a results interface. In some embodiments, generating source numbers from a SNDRN comprises generating digital source numbers; filtering the source numbers comprises filtering digital source numbers and producing quasi-continuous digital filter output numbers; and abstracting the filter output numbers to produce abstracted numbers comprises abstracting quasi-continuous digital filter output numbers and producing quasi-continuous digital abstracted numbers. In some embodiments, abstracting quasi-continuous digital filter output numbers comprises feeding the quasi-continuous digital filter output numbers to an artificial neural network (ANN). In some embodiments, the phase-sensitive filter comprises a complex filter.

Another basic method of detecting an anomalous effect associated with an influence of mind, comprises: generating a plurality of streams of source numbers from a plurality of sources of non-deterministic random numbers (SNDRNs); producing a plurality of streams of filter output numbers by filtering separately a plurality of the streams of source numbers using a phase-sensitive filter for each stream; producing abstracted numbers indicative of an influence of mind by feeding the plurality of streams of filter output numbers to an abstracting processor; and using the filter output with a results interface. In some embodiments, the abstracting processor comprises an artificial neural network (ANN). Some embodiments comprise: providing an artificial sensory neuron (ASN) containing an analog source of non-deterministic random numbers (SNDRN); generating a stream of analog source numbers using the ASN; and abstracting the stream of analog source numbers using an analog artificial neuron network (ANN) to produce abstracted output numbers. Some embodiments further comprise providing a plurality of ASN containing an analog SNDRN. Some embodiments comprise providing a local cluster of ASNs contained in a roughly spherical volume having a diameter in a range of about from 0.1 mm to 1.0 mm.

A method in accordance with the invention of responding to an influence of mind using an artificial consciousness network, ACN comprises: providing an artificial sensory neuron (ASN) containing a source of non-deterministic random numbers (SNDRN); generating a stream of source numbers using the ASN; producing abstracted numbers indicative of an influence of mind by using a sensory artificial neural network (sensory ANN) to process the source numbers from the ASN; and producing an output indicative of a number of specific influences of mind operating on the ACN by feeding the abstracted numbers from the sensory ANN to a meta-analyzer artificial neural network (meta-analyzer ANN) comprising an activation pattern meta-analyzer. Some embodiments further comprise: before using the sensory ANN, filtering the source numbers to change digital source numbers to quasi-continuous digital source numbers using a low-pass filter. Some embodiments comprise: providing a plurality of artificial sensory neurons (ASNs), each ASN containing a source of non-deterministic random numbers (SNDRN); generating a stream of source numbers from a plurality of the ASNs; producing abstracted numbers indicative of an influence of mind by feeding a stream of source numbers from each of a plurality of the ASNs to one of a plurality of sensory ANNs; and producing an output indicative of a number of specific influences of mind operating on the ACN by feeding the abstracted numbers from the sensory ANN to a meta-analyzer artificial neural network (meta-analyzer ANN) comprising an activation pattern meta-analyzer.

A basic embodiment of a method of responding to an influence of mind using an artificial consciousness device, comprises: producing sensory signals using a sensory input device; feeding the sensory signals to an artificial neural network (ANN) in an artificial consciousness network (ACN) of a cluster of a plurality of artificial consciousness networks (cluster of ACNs); abstracting the ASN signals using the cluster of ACNs to produce a cluster output indicative of an influence of mind; and sending the cluster output to an output device; wherein an ACN in the cluster of ACNs comprises: a sensory artificial neural network (sensory ANN), the sensory ANN being operable to process ASN signals to produce abstracted numbers indicative of an influence of mind; and a meta-analyzer artificial neural network (meta-analyzer ANN) comprising an activation pattern meta-analyzer, the meta-analyzer ANN being operable to accept abstracted numbers from a sensory ANN and to respond to a number of states associated with consciousness operating on or in the ACN. Some embodiments further comprise exchanging numbers between the ACN cluster and a signal processor. Some embodiments further comprise exchanging numbers between the ACN cluster and an information database and memory. Some embodiments comprise producing a plurality of streams of sensory signals using a plurality of sensory input devices; and feeding the stream of sensory signals to a plurality of ANNs of at least one ACN in the cluster of ACNs.

Other features, characteristics and advantages of embodiments in accordance with the invention will become apparent from consideration of the description and drawings below.

BRIEF DESCRIPTION OF DRAWINGS

A more complete understanding of the invention may be obtained by reference to the drawings, in which:

FIG. 6 contains a block diagram illustrating a general embodiment of a multi-stream source of non-deterministic random numbers (SNDRN) in accordance with the present invention;

FIG. 7 contains a block diagram of a self-seeding randomness corrector that is operable with a non-deterministic random number source in accordance with the invention;

FIG. 8 depicts schematically an Exclusive-OR (XOR) logic gate that is operable in accordance with the invention;

FIG. 9 depicts schematically a parity generator that is operable in accordance with the invention;

FIG. 27 depicts the calculation of seven factors F1-F7 in a factoring module from the dot product of the eigenmatrix and the eigenvector;

FIG. 28 contains a graph of the empirical cumulative distribution function (CDF) of unaltered ANN output;

FIG. 29 contains a graph of the CDF of the same data as in the graph of FIG. 28 after normalization;

FIG. 30 contains a graph showing the CDF after applying a z-to-p conversion;

FIG. 31 contains a graph showing the result of linearizing the data of FIG. 30 by curve-fitting;

FIG. 33 depicts schematically an exemplary artificial consciousness device (ACD) in accordance with the invention.

MODES FOR CARRYING OUT THE INVENTION

Figure 1:
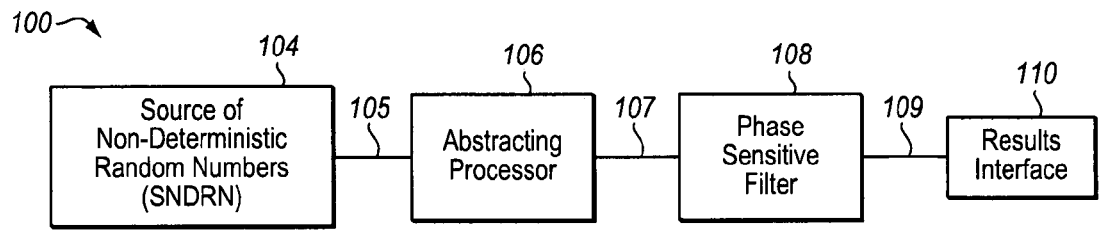
FIG. 1 contains a block diagram representing a general embodiment of an anomalous effect detector containing a phase-sensitive filter in accordance with the invention.

The invention is described herein with reference to FIGS. 1-33. It should be understood that these figures, depicting elements, systems and processes of embodiments in accordance with the invention, are not meant to be actual views or diagrams of any particular portion of an actual equipment component, apparatus or process. The figures instead show idealized representations that are employed to explain more clearly and fully the structures, systems and methods of the invention than would otherwise be possible. Also, the figures represent only one of innumerable variations of structures and systems that could be made or adapted to use a method in accordance with the invention. Devices and methods are described with numerous specific details, such as components, oscillator frequencies and mathematical techniques, in order to provide a thorough understanding of the present invention. It will be obvious to one skilled in the art that these specific details are not required to practice the present invention. It is clear that embodiments in accordance with the invention can be practiced using structures, devices and processes different from those of FIGS. 1-33. The preferred embodiments described herein are exemplary and are not intended to limit the scope of the invention, which is defined in the claims below.

For the sake of clarity, in some of the figures below, the same reference numeral is used to designate structures and components that are the same or are similar in the various embodiments described.

The term "digital number" is used broadly to include all forms of digital, numbers, including binary bits and digital words. Embodiments in accordance with the invention are described herein frequently with reference to digital numbers, for example, binary bits. It is understood, however, that some embodiments in accordance with the invention also include the generation and processing of analog numbers instead of or in addition to the generation and processing of digital numbers. The singular and plural forms of the word "number" are used broadly and sometimes used interchangeably in this specification. For example, the term "non-deterministic random numbers" may indicate an analog signal in some embodiments, as well as a sequence or subsequence of binary bits or other digital numbers in other embodiments. The term "number" in this specification is used broadly to include, among other common meanings in the field: a signal, a binary bit, a word, a pulse rate, and a pulse rate interval.

The terms "non-deterministic", "non-deterministic bits", "true random number", "true random bits" and related terms are used in this specification interchangeably to designate a quality of true randomness of a number or bit of information, which means that the number or bit cannot be calculated or determined with certainty in advance. Non-deterministic random numbers can be thought to be arbitrary, unknowable, and unpredictable. For the sake of brevity, the abbreviated terms "random number" and "random numbers" are sometimes used in this specification synonymously with the terms denoting non-deterministic numbers, such as "non-deterministic random number" and "true random numbers". In this specification, the term "entropy" generally refers to a measure of the disorder or randomness of a system or object. A sequence of non-deterministic random bits uninfluenced by mind has an entropy approaching 1.0 bit of entropy per bit.

The terms "source of non-deterministic random numbers", "SNDRN", "source of NDRN", "non-deterministic random number source" and related terms are used synonymously in this specification to refer to a device that is operable to generate and to provide non-deterministic random numbers in accordance with the invention. A source of non-deterministic random numbers in accordance with the invention is sometimes referred to in the art as a non-deterministic random number generator or a true random number generator. A SNDRN in accordance with the invention generally includes a source of entropy, such as a noise diode, a zener diode, a photodiode, an avalanche diode, a semiconductor junction, a resistor and a radiation detector.

The term "pseudorandom" and related terms in this specification means deterministic or algorithmically generated. It is known that some numbers are able to pass some or all known mathematical tests for randomness, but still be deterministic, that is, calculable or knowable in advance.

The term "quasi-random" and related terms in this specification refers to a number that includes both true random (i.e., non-deterministic) components and algorithmically generated (i.e., deterministic) components.

The term "mind" (and the associated adjective "mental") in this specification is used in a broad sense. The term "mind" includes a commonly accepted meaning of human consciousness that originates in the brain and is manifested especially in thought, perception, emotion, will, memory, and imagination. The term "mind" further includes the collective conscious and unconscious processes in a sentient organism that direct and influence mental and physical behavior. Embodiments in accordance with the invention are described herein usually with reference to a human operator and a human mind. It is understood, however, that embodiments in accordance with the invention are also operable to respond to an influence of the minds of other sentient organisms in addition to humans. Also, embodiments in accordance with the invention are described herein usually with reference to a conscious human mind in a state of awareness. It is understood, however, that embodiments in accordance with the invention are operable to respond to an influence of a mind not in a state of conscious awareness. Although the mind of a sentient organism generally is associated with functions of the brain, the term "mind" in this specification is not necessarily limited to functions of the brain, nor is the term "mind" in this specification necessarily related to functions of the brain.

The term "anomalous effect" and related terms in this specification include influences of mind that are not mediated by classical energies or forces. In one sense, the terms refer to the effects of mind on number sources and on physically measurable properties. Traditionally, concepts associated with anomalous effects have been used to explain such phenomena as ESP, Psi, Psychic Phenomena, Remote Viewing, Telepathy, Clairvoyance, Clairaudience, Psychokinesis, Precognition, Mental Powers, among others.

The terms "quantum mechanics", "quantum mechanical" and related terms in this specification refer to a fundamental branch of theoretical physics that complements Newtonian mechanics and classical electromagnetism, and often replaces Newtonian mechanics and classical electromagnetism at the atomic and subatomic levels. Quantum mechanics is the underlying framework of many fields of physics and chemistry, including condensed matter physics, quantum chemistry, and particle physics along with general relativity. It is one of the pillars of modern physics. Quantum mechanics is a more fundamental theory than Newtonian mechanics and classical electromagnetism, in the sense that it provides accurate and precise descriptions for many phenomena "classical" theories simply cannot explain.

The terms "quantum superposition", superposition and related terms in this specification refer to a phenomenon of quantum mechanics that occurs when an object simultaneously "possesses" two or more values (or states) of an observable quantity. It is postulated that when the observable quantity is measured, the values will randomly collapse to one of the superposed values according to a quantum probability formula. The concept of choice (e.g., free will) in a sentient being presupposes the superposition of possibilities.

The terms "quantum entanglement", entanglement and related terms in this specification refer to a quantum mechanical phenomenon in which the quantum states of two or more objects (including photons and other forms of energy) have to be described with reference to each other, even though the individual objects may be spatially separated. Quantum entanglement is the basis for emerging technologies, such as quantum computing. Entanglement can be across time or space.

The term "quantum computer" generally refers to any device for computation that makes direct use of distinctively quantum mechanical phenomena, such as superposition and entanglement, to perform operations on data. In this specification, the term "quantum computer" and related terms refer to a device that is operable to respond to an influence of the mind of a sentient organism (usually a human operator) on quantum mechanical wavefunctions. In this specification, the terms "bit"; "bits" and related terms are used broadly to include both classical (or conventional) bits of information and quantum mechanical bits, or qubits.

A qubit is a basic unit of quantum information contained within a physical entity that embodies a superposition of two states. A measurement of the qubit's state collapses the superposition randomly to a determined bit with a value of 1 or 0. Certain influences can cause the probability of the collapsed bit being 1 to be different than 50%. This includes an influence of mind.

An influence of mind can also produce an implicit entanglement between the wavefunction of a qubit and a test number or non-inferable information. Such an influence of mind increases the probability that the measured state of the qubit will be related to a test number or non-inferable information.

Non-inferable information is information that is either hidden or cannot be inferred from presently available information.

A plurality of qubits can be entangled to produce an exponentially increased number of superposed states. All the qubits and their superposed states are collectively subject to an influence of mind so that when a measurement is made, there is an enhanced probability that the measured state of the qubits is related to a test number or non-inferable information.

A plurality of qubits can be implicitly entangled with each other and with one or more test numbers or non-inferable information. The resultant measurements of these qubits' states can be processed by various converters such as a cross-correlation converter followed by a bias amplifier, and combined to greatly enhance the probability of a correct relationship in the processed output to the test numbers or non-inferable information.

Implicit entanglement greatly simplifies the construction of the assembly of qubits. Usually, the requirement of quantum coherence between the qubits is met by extremely rigorous control of physical structure and environment of the quantum circuit that embodies the qubits. Implicit entanglement caused by an influence of mind can partially entangle physical sources of entropy, which only contain a component of quantum mechanical superposition. The entanglement can span both distance and temporal displacement, and exist under conditions that would normally destroy any useful quantum coherence.

A programming input can be used to alter the wavefunction of one or more qubits. The signal' supplied to the programming input can be derived from the measured states of other qubits or from a conditional processed signal. A conditional, or non-final, signal produced from a previous one or more measurements and processing. This provides a means of enhancing both the accuracy and speed of providing a final processed output representative of an influence of mind.

The term "general computer" in this specification is used broadly to refer to a conventional computer, which typically has an input device (e.g., a keyboard), a central processing unit (CPU), memory, and a results interface (e.g., screen, printer). Examples include conventional desktop, laptop and some handheld devices.

A filter in accordance with the invention is embodied in hardware or software or in a combination of hardware and software. In some embodiments, a filter in accordance with the invention is a phase-sensitive filter, as known in the art electronics arts, particularly in the art of signal processing. Generally, a phase-sensitive filter in accordance with the invention is phase-sensitive at a particular frequency band width or at a multiplicity of frequency band widths, such as in a fast Fourier transform (FFT). In some embodiments, a filter generates a single output. In some embodiments, a filter in accordance with the invention is a complex filter; that is, it generates both a real output and an imaginary output. Generally, the real and imaginary outputs of a complex filter represent the cosine and sine (0 and 90 degree) phases, respectively.

In some exemplary embodiments, input data of one or more sequences of binary non-deterministic random number are filtered by one or more phase-sensitive filters. In some exemplary embodiments, input data of one or more sequences of binary non-deterministic random number are filtered by one or more low-pass filters. In some exemplary embodiments, input data of one or more sequences of analog non-deterministic random are filtered by phase-sensitive filters or low-pass filters.

In an exemplary embodiment, a filter processes signals in synchrony with the phase of an analog signal. Accordingly, the filter output is analog; that is, the output smoothly changes. Phase sensitivity is important.

Generally, a filter in accordance with the invention filters a signal at a specific phase and frequency (band) or at a plurality of specific phases and frequencies, and determines the amplitude at the selected frequencies and phases. Without being bound to a particular theory, it has been observed that a correlation exists between influences of mind and the amplitudes determined by a filter in accordance with the invention.

A real and an imaginary phase are orthogonal, that is, they differ by 90°. As a result, they are statistically independent. In some embodiments, the analog output of a complex filter is considered to have analog output in two orthogonal planes (e.g., in the x and y planes). Thus, an anomalous effect detector having a complex filter in accordance with the invention is operable to place an output data point in a two-dimensional (2-D) plane.

Another example of a phase-sensitive filter is a discrete Fourier transform (DFT), which is operable on a block of input data to produce an average output of both real and imaginary parts. Alternately, in some embodiments, the output of a discrete Fourier transform is represented by a phase and amplitude. Another exemplary filter comprises a fast Fourier transform (FFT), which is operable to transform a block of input data into a multiplicity of real and imaginary outputs covering a spectrum of frequencies. Both a DFT and a FFT filter inherently produce an averaged or effectively low-pass filtered output.

With respect to the output of a phase-sensitive filter and of a low-pass filter and to the processing of filter output, the term "analog" and related terms is used broadly to include quasi-continuous, effectively analog properties.

It is believed that in some embodiments an influence of mind causes input data (e.g., non-deterministic random numbers) to become synchronized with one or more phases of a synchronous filter, allowing the output of the filter to indicate the presence of such an influence. In an exemplary single-phase filter, deviations of measured amplitude from a Gaussian distribution indicate an influence of mind.

In some embodiments, one or more sources of randomness are single channel; that is, each source generates a sequence (or stream) of non-deterministic random numbers. In some embodiments, one or more sources of randomness are multi-channel; that is, each source generates a plurality of sequences (or streams) of non-deterministic random numbers. In a working example, a binary signal was low-pass filtered. In such a system, one filter produces one stream, and seven filters (for example) produce a total of seven streams.

In some embodiments, factor analysis is used to reduce numerous filter-output streams into fewer streams. For example, in some embodiments, three-dimensional (3-D) output is reduced to 2-D output on a screen. Reducing the number of streams is sometimes referred to as "abstracting". An example of abstracting information to fewer channels is reducing seven streams to one stream in both the x and y directions.

Some embodiments are operable to produce audible tones when a filter is operated at high frequency, and many individual or bands of frequencies are combined. Thus, some embodiments are operable to generate an Electronic Voice Phenomenon (EVP) as a result of mental effect.

Descriptions in this specification of embodiments in accordance with the invention often refer to processing of numbers generated by one or more sources of non-deterministic numbers. In accordance with the invention, an influence of mind on non-deterministic numbers changes their properties so that they are no longer completely non-deterministic. Although references are sometimes made in the specification to such mind-influenced numbers using terms such as "non-deterministic numbers", the actual meaning of these terms is clear from the context of these references.

The terms "to abstract", "abstracting", "abstraction" and related terms as used in this specification generally refer to a process or processes that reduce the total amount of incoming data while substantially preserving the information originally contained in the data. As used in this context, the term "information" generally means a pattern in a sequence of numbers resulting from an influence of mind. In the art of signal processing, abstracting is commonly described as increasing the signal to noise ratio. In statistics, majority voting is a well-known abstraction technique. International Publication Number WO 2007/014031, published 1 Feb. 2007, teaches devices and methods for abstracting data to detect an influence of mind. For example, International Publication Number WO 2007/014031 teaches converters selected from a group including: a bias amplifier, an autocorrelation converter, a cross-correlation converter, a runs converter, a transitions converter, a mutual bias converter and a pattern correlation converter. A bias amplifier typically is operable to amplify bias of an input of numbers. In some embodiments, a bias amplifier is operable to perform a bounded random walk. In some embodiments, a bias amplifier is operable to perform a truth table bias function. In some embodiments, an artificial neural network (ANN) or a plurality of ANNs functions to abstract data in accordance with the invention.

FIG. 1 contains a block diagram representing a general embodiment of an anomalous effect detector 100 in accordance with the invention. Anomalous effect detector 100 includes a source of non-deterministic random numbers 104. An exemplary source of non-deterministic random numbers comprises an independent oscillator random number source. U.S. Pat. No. 6,862,605, issued Mar. 1, 2005, to Wilber, which is hereby incorporated by reference as if fully contained herein, teaches an independent oscillator device and a method of generating non-deterministic random numbers. U.S. Pat. No. 6,324,558, issued Nov. 27, 2001, to Wilber, which is hereby incorporated by reference, teaches a true (non-deterministic) random number generator circuit connected to a general-purpose computer. The circuit includes a flat source of white noise, and the circuit is powered by the computer. Examples of non-deterministic random number generators (i.e., non-deterministic random number sources) are described in detail below. In embodiments of anomalous effect detector 100, source 104 of non-deterministic random numbers generally includes a non-deterministic random noise (entropy) source (not shown). A wide range of entropy sources are suitable to provide non-deterministic numbers in a source of non-deterministic random numbers in accordance with the invention. Examples include components exhibiting thermal noise and shot noise. Examples of shot noise sources include sources of electronic noise and photonic noise.

Source of non-deterministic random numbers (SNDRN) 104 is operable to generate non-deterministic random numbers 105. Preferably, but not necessarily, SNDRN 104 includes a randomness corrector, as described below and in International Publication Number WO 2007/014031, published 1 Feb. 2007. In some embodiments of an anomalous effect detector, the source of non-deterministic random numbers is operable to generate non-deterministic random binary bits. In some embodiments, source 104 is operable to generate an analog non-deterministic random signal. In some embodiments, source 104 is operable to generate non-deterministic random numbers having a bias less than 10 parts per million (ppm) and an autocorrelation less than 10 ppm for any order of autocorrelation. In some embodiments, source 104 is operable to generate non-deterministic random numbers having a bias less than 1 ppm and an autocorrelation less than 1 ppm for any order. In some embodiments, source 104 of non-deterministic random numbers is located in an integrated circuit. In some embodiments, source 104 of non-deterministic random numbers comprises an independent ring oscillator. In some embodiments, source 104 of non-deterministic random numbers comprises a single electron transistor random source. In some embodiments, source 104 of non-deterministic random numbers comprises a summed multisource SNDRN. An analog SNDRN in accordance with the invention typically is considered to cover a spectrum of frequencies and phases over a broad range of frequencies; in other words, the amplitudes at any frequency and phase are normally distributed. A phase-sensitive filter picks out a small band of frequencies at a particular phase, or a set of frequencies at particular phases. Without being bound to a particular theory, it is believed that mind, conscious or unconscious, causes the source to produce a signal that is synchronous, or aligned, to the phase frequency of the filter, resulting in a larger or smaller (i.e., not non-deterministic) output amplitude than in a normal distribution.

As depicted in FIG. 1, anomalous effect detector 100 preferably includes an abstracting processor 106. In some embodiments, abstracting processor 106 is a converter that utilizes truth table functions to abstract source numbers 105. In some embodiments, SNDRN 104 generates binary source numbers so that abstracting processor 106 is able to perform binary abstracting transformations of source numbers 105.

As depicted in FIG. 1, anomalous effect detector 100 further includes a phase-sensitive filter 108. Filter 108 is operable to filter abstracted numbers 107 from the output of abstracting processor 106 and produce quasi-continuous digital filter-output numbers 109. Results interface 110 is operable to accept filter output 109 from filter 108. An example of a results interface 110 includes: a computer monitor, a computer speaker, a sound transducer, an LED display, a cell phone screen, a cell phone speaker, a mechanical transducer and a physiological stimulator. In some embodiments (not shown), a phase-sensitive filter 108 is sufficiently operable to abstract source numbers 105 so that an abstracting processor 106 is not necessary.

Figure 2:
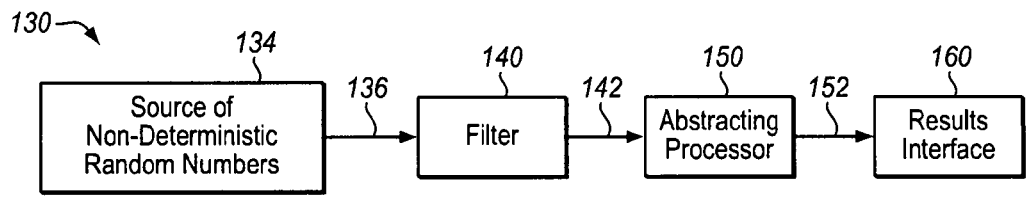
FIG. 2 contains a block diagram representing a preferred general embodiment of an anomalous effect detector containing a phase-sensitive filter in accordance with the invention.

FIG. 2 contains a block diagram representing another general embodiment of an anomalous effect detector in accordance with the invention. Anomalous effect detector 130 includes a source 134 of non-deterministic random numbers. SNDRN 134 is operable to generate non-deterministic random numbers 136. An exemplary source of non-deterministic random numbers comprises an independent-oscillator SNDRN. Generally, SNDRN 134 includes a source (not shown) of entropy. Preferably, SNDRN 134 also includes a randomness corrector (not shown) that is operable to accept random numbers (or a random signal) from an entropy source and to reduce one or more statistical defects in the random numbers, thereby reducing statistical defects in non-deterministic random numbers 136. Randomness correctors and correcting randomness are described in more detail below. In some embodiments, SNDRN 134 is operable to generate an analog non-deterministic random signal. In some embodiments, source 134 is operable to generate non-deterministic random binary bits. In some embodiments, a randomness corrector is operable to reduce bias in non-deterministic random numbers 136 to less than 10 ppm and to reduce autocorrelation of any order in non-deterministic random numbers 136 to less than 10 ppm. In some embodiments, a randomness corrector is operable to reduce bias in the non-deterministic random numbers 136 to less than 1 ppm and to reduce autocorrelation of any order in non-deterministic random numbers 136 to less than 1 ppm. In some embodiments, a randomness corrector comprises a linear feedback shift register randomness corrector. In some embodiments, a randomness corrector comprises a randomness corrector operable to perform a function selected from the group consisting of: performing an XOR function on (XORing) output numbers from the SNDRN with the output of a pseudorandom number generator; XORing output numbers from the SNDRN with the output of an independent non-deterministic random number source; and XORing a number of consecutive output numbers of the SNDRN.

Figure 4:
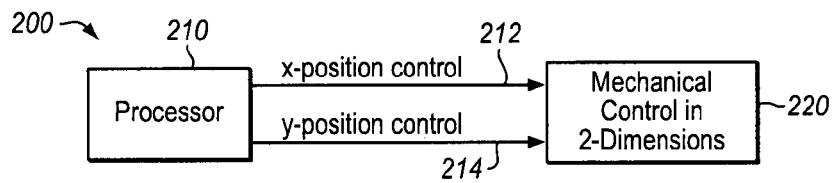
FIG. 4 contains a block diagram representing a general embodiment of a processor in accordance with the invention that is operable to accept filter output data, to process the filter output data, and to generate processor output.

As depicted in FIG. 2, anomalous effect detector 130 also includes a phase-sensitive filter 140. Filter 140 is operable to accept input data comprising source numbers 136 from SNDRN 134. Anomalous effect detector 130 further includes abstracting processor 150. Abstracting processor 150 is operable to accept quasi-continuous digital filter output 142 from filter 140 and to generate abstracted processor output 152. An example of an abstracting processor is a combiner (e.g., a majority voting processor). An example of an abstracting processor is an artificial neural network (ANN). As depicted in FIG. 4, in some embodiments, a processor has two outputs. Anomalous effect detector 150 further includes a results interface 160, which is operable to accept abstracted output 152 from abstracting processor 150. An example of a results interface 160 includes: a computer monitor, a computer speaker, a sound transducer, an LED display, a cell phone screen, a cell phone speaker, a mechanical transducer and a physiological stimulator.

Figure 3:
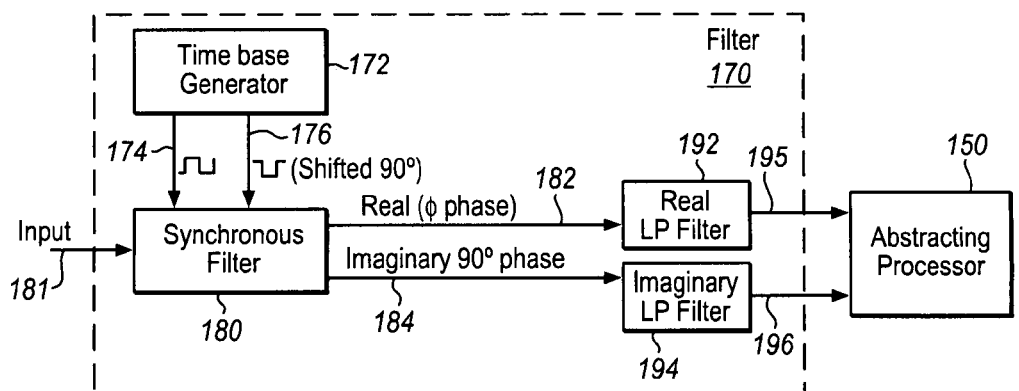
FIG. 3 contains a block diagram representing a general embodiment of a phase-sensitive filter in accordance with the invention.

FIG. 3 contains a block diagram representing an exemplary embodiment of a phase-sensitive filter 170 in accordance with the invention. As depicted in FIG. 3, filter 170 comprises a time base generator 172. Time base generator 172 is operable to generate square-wave output 174 and square-wave 176, which is shifted 90° from square-wave 174. Filter 170 further comprises synchronous filter 180. Synchronous filter 180 is operable to accept input data 181 (e.g., source numbers from SNDRN 134). Synchronous filter 180 generates real data 182 and imaginary data 184, which is shifted 90° from the phase of real data 182. Filter 170 further comprises real low-pass filter 192 and imaginary low-pass filter 192. Real low-pass filter 192 is operable to accept real data 182 as input and to generate real filter output 195. Imaginary low-pass filter 194 is operable to accept imaginary data 184 as input and to generate imaginary filter output 196. An abstracting processor 150 serves to process real filter output 195 and imaginary filter output 196. When data input is binary, a low-pass filter functions to change binary input to a effectively analog output.

FIG. 4 contains a block diagram 200 representing a general embodiment of an abstracting processor 210 in accordance with the invention that is operable to accept filter output data, to process the filter output data, and to generate abstracted output. In some embodiments, processor 210 includes an artificial neural network (ANN). Artificial neural networks are well-known in the field of signal processing. In some embodiments, processor 210 processes real filter output to generate x-position mechanical control 212 in a 2-D system 220, and processor 210 also processes imaginary filter output to generate y-position mechanical control 214 in 2-D system 220.

Figure 5:
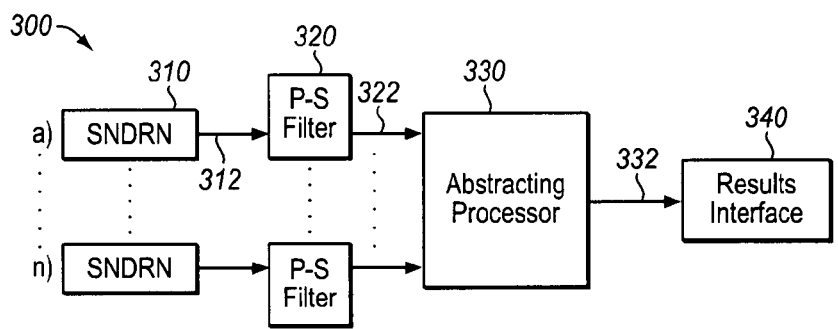
FIG. 5 contains a block diagram representing a general embodiment of an anomalous effect detector in accordance with the invention having a plurality of sources of non-deterministic random numbers (SNDRNs) and a plurality of filters in accordance with the invention.

FIG. 5 contains a block diagram representing a general embodiment of an anomalous effect detector 300 in accordance with the invention having a plurality of non-deterministic random number sources and filters in accordance with the invention. Anomalous effect detector 300 includes a plurality of sources 310 of non-deterministic numbers (SNDRNs). Each of SNDRNs 310 is operable to generate a stream 312 of non-deterministic random numbers. In some embodiments, each of SNDRN 310 is operable to generate a binary sequence of non-deterministic random numbers. In some embodiments, each of SNDRNs 310 is operable to generate an analog stream of non-deterministic random numbers. Anomalous effect detector 300 further comprises a plurality of filters 320. Each of phase-sensitive (P-S) filters 320 is in series with one of SNDRNs 310 and is operable to accept source numbers 312 from a SNDRN 310 and to generate a filter output 322. Examples of filters 320 include a synchronous filter, a fast Fourier transform (FFT) filter and a discrete Fourier transform (DFT) filter. Anomalous effect detector 300 also includes an abstracting processor 330, which is operable to accept filter output data 322 from filters 320 and to process the data to generate results 332, which are then transmitted to a results interface 340. An example of an abstracting processor 330 is a majority vote algorithm or an artificial neural network as known in the field of signal processing. In some embodiments, an abstracting processor 330 is operable to add together the output amplitudes of n number of filter outputs and divide by the square root of n to calculate a single output, the z-score.

EXAMPLE 1

An anomalous effect detector in accordance with the invention contained a synchronous filter that included a synchronous multiplier (or synchronous detector) and a low-pass filter. The synchronous filter was set to filter at 5000 Hz frequency. The cut-of frequency of the low-pass filter was set at 10 Hz. Thus, the bandwidth of the synchronous filter was 10 Hz. From a ring oscillator in a computer, 7000 binary bits per second were extracted and input into the filter. The synchronous square-wave multiplier alternately multiplied the input by +1, then by −1, with a cycle of 14 input bits. In other words, after every seven input numbers, the filter multiplier switched between +1 and −1. The output of the low-pass filter was quasi-continuous digital filtered output. Without an influence of mind, the output was expected to vary randomly between "1" and "−1" following a normal Gaussian distribution. A number of measurements in a selected time period above or below "0" indicated an influence of mind.

EXAMPLE 2

In another working example, an input sequence of source numbers from a source of non-deterministic numbers was processed in a complex filter into a real output and an imaginary output. Thus, the complex filter produced two independent (orthogonal) outputs. Without an influence of mind, each output had a standard Gaussian distribution. When the source numbers were influenced by mind, however, the amplitudes of the two outputs deviated from a normal distribution. The complex filter output was used to produce an "X" and "Y" output by mathematically convening the Gaussian numbers to probabilities, which were uniformly distributed [0,1]. This provided a 2-D analog control.

In some embodiments, an artificial neural network is used to process output beyond the filter output.

FIG. 6 contains a block diagram illustrating an exemplary embodiment of a multi-stream SNDRN 500 in accordance with the present invention. Multi-stream SNDRN 500 includes noise diode 510, which is a source of entropy operable to generate an analog signal 512. Types of devices suitable for use as a source 510 of entropy include, for example, a noise diode, a zener diode, a photodiode, an avalanche diode, a semiconductor junction, a resistor and a radiation detector.

Multi-stream SNDRN 500 further includes analog-to-digital converter (ADC) 520. ADC 520 is operable to convert analog signal 512 to n number of ADC output lines 522, wherein n≥2. As depicted in FIG. 6, ADC 520 has n=8 output lines 522. Typically, multi-stream SNDRN 500 further includes one or more amplifiers 524 to adjust the amplitude of analog noise signal 512 provided by noise source 510 before the noise signal enters ADC 520. The amplified noise signal preferably has an average peak-to-peak amplitude about equal to the full-scale input range of ADC 520. Preferably, the analog signal 512 of noise source 510 and ADC 520 together have a full-power bandwidth about two times the sampling frequency of ADC 520. In other words, the total transfer function of analog signal path 522 preferably has a full power bandwidth of twice the sampling frequency of ADC 520.

Depending on the intended use of a multi-stream SNDRN and of the sequences of random numbers it generates, the minimum permissible amount of entropy in the sequences from each of the output lines is optimized by selecting the number m of output lines that are corrected in randomness correctors. Preferably, selection of the number m of output lines to be corrected from the total number n of ADC output lines is conducted through mathematical modeling and simulation in accordance with the invention. The number of lines n to be used can be determined by theoretically modeling the cross-correlation matrix of all the output lines while varying the RMS or peak-peak amplitude of the of the ADC input signal relative to the full-scale input range of the ADC. The cross-correlation increases for the pairs of more significant bits. The cross-correlation is related to the mutual entropy in the pairs of sequences, so the input amplitude and the number of less-significant bits is adjusted to achieve the desired level of independent entropy in the selected number of sequences n.

The source of non-deterministic random bits generated in accordance with the invention have true entropy. As a result, random data generated in accordance with the invention are able to be influenced by mind.

Exemplary commercially-available noise diodes suitable for use as a noise source 510 in a non-deterministic random number source in accordance with the invention include: NoiseCom NC 302LBL; and Panasonic MAZ80620ML. An exemplary amplifier suitable for use as an amplifier 524 is a MAR-65M available from Microcircuits. Exemplary analog-to-digital converters suitable for use as an ADC 520 include: ADC 08200 CIMT (200 MHz) and ADC 081000 (1 GHz), both available from National Semiconductor.

FIG. 7 contains a block diagram of a self-seeding randomness corrector 540 suitable for use with a source of non-deterministic random numbers in accordance with the invention, such as multi-stream SNDRN 500. Randomness corrector 540 typically comprises data input 542 to receive data 543 (e.g., an uncorrected sequence of bits); for example, data from an output line 522 of ADC 520. Randomness corrector 540 also includes serial shift register (SSR) 550 having a plurality of latches 552 and a plurality of shift intervals 554 (e.g., L1, L2, L3, L4). Randomness corrector 540 includes a plurality of parallel data sampling taps 558, each data tap located at a latch. Randomness corrector 540 further comprises a nonlinear combining element 560, which is operable to accept data 543 via input 542, to accept data 562 from a plurality of parallel data taps 558, to combine input data 543 and the data 562 from parallel data taps 558 into a corrected bit 564, and for inputting corrected bit 564 into an input of SSR 550. A data clock 568 is operable to shift data through randomness corrector 540. As data is clocked by data clock 568 during operation, typically the following occurs: a corrected data bit 564 is sampled (read) in line 570 from the nonlinear combining element 560; corrected bit 564 enters SSR 550; a new data bit 543 is input into nonlinear combining element 560; and data bits 562 from parallel data taps 558 move into nonlinear combining element 560.

Each shift interval of SSR 550 corresponds to a predetermined number of bit shifts. In preferred embodiments, randomness corrector 540 is operable to sample a plurality of parallel SSR output signals (e.g., output signals 562) from a plurality of data sampling taps (e.g., data taps 558) that are separated from each other by relatively prime shift intervals.

In some embodiments, a plurality of data taps are connected to an input of a nonlinear combining element, the plurality of connected data taps being separated from each other by relatively prime shift intervals. In some embodiments, a randomness corrector comprises a plurality of shift registers connected in series.

Examples of devices that are suitable to function as nonlinear combining element 560 include: an Exclusive-Or (XOR) gate, a parity generator, a binary adder with carry, a binary subtracter with borrow, a look-up table, or a pseudo-random number generator.

An exemplary randomness corrector 540 comprises an FPGA having part number EP1C3T144C6, available from Altera.

FIG. 8 depicts schematically an XOR gate 580 suitable for use in accordance with the invention. As depicted in FIG. 8, a data input (DI) line 543 and a plurality of parallel SSR output (D1-D4) signals enter into XOR gate 580, which produces an output data bit 564.

FIG. 9 depicts schematically parity generator 590 suitable for use in accordance with the invention. As depicted in FIG. 9, a data input (DI) line 543 and a plurality of parallel SSR output (D1-D4) signals 562 enter into parity generator 590, which produces an output data bit 564.

Figure 10:
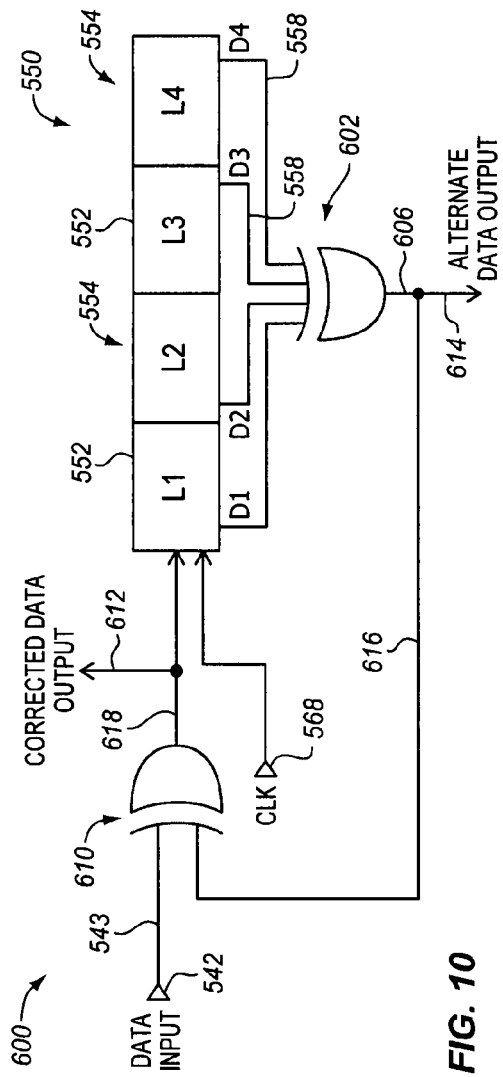
FIG. 10 contains a block diagram of another self-seeding randomness corrector suitable for use with a non-deterministic random number source in accordance with the invention.

FIG. 10 contains a block diagram of another self-seeding randomness corrector 600 suitable for use in a source of non-deterministic random numbers in accordance with the invention, such as with multi-stream SNDRN 500. Randomness corrector 600 comprises a nonlinear combining element 602, which is operable to accept data (D1-D4) from a plurality of parallel data taps 558 of a serial shift register (SSR) 550 and to combine the data (D1-D4) from parallel data taps 558 of latches 552 into a line 606, which is input for nonlinear combining element 610. The output 612 of randomness corrector 600 serves as alternate data output 614 of a corrected sequence of random bits. Nonlinear combining element 610 is operable to accept input data 543 via input 542 (e.g., from a selected one of the output lines 522 of ADC 520), and to accept data from line 616, for the purpose of combining input 543 (e.g., the one selected ADC output line) and the data from line 616 into a corrected sequence of bits 618, and for inputting the corrected sequence 618 of bits into an input of SSR 550. In an exemplary randomness corrector 600, all logic is implemented inside an Altera FPGA EP1C3T144C6. As described with reference to FIG. 10, SSR 550 contains four shift intervals 554. It has been observed that four shift intervals is a minimum number of shift intervals for good results. It is understood, however, that some embodiments in accordance with the invention include more than four shift intervals. It is also understood that in some embodiments in accordance with the invention, a SSR 550 in a randomness corrector 600 contains only two or three shift intervals.

Figure 11:
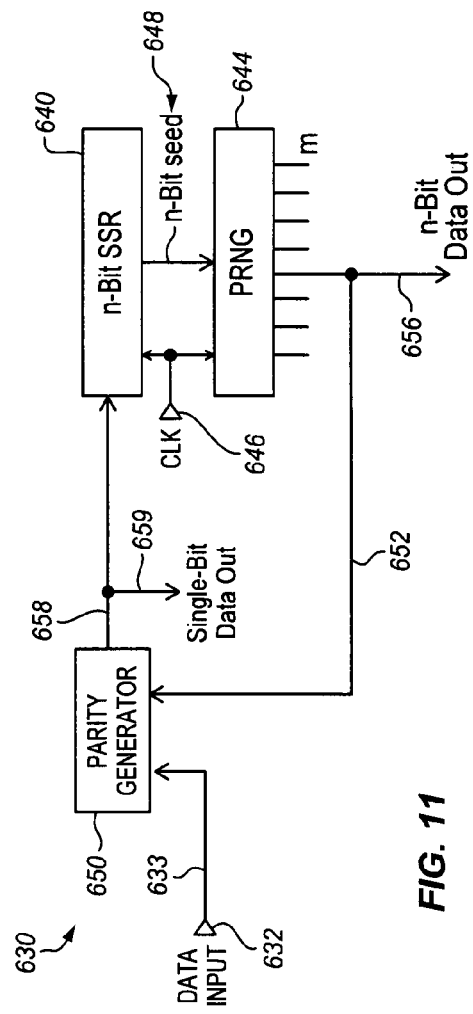
FIG. 11 contains a block diagram of another self-seeding randomness corrector suitable for use with a non-deterministic random number source in accordance with the invention.

FIG. 11 contains a block diagram of another self-seeding randomness corrector 630 suitable for use with a source of non-deterministic random numbers in accordance with the invention, such as with multi-stream SNDRN 500. Randomness corrector 630 typically comprises data input 632 to receive data 633 (e.g., an uncorrected sequence of bits); for example, data from an output line 522 of ADC 520. Randomness corrector 630 also includes n-bit serial shift register (SSR) 640, which is a serial-in—parallel-out type shift register. Randomness corrector 630 includes a plurality of parallel data taps (not shown), each data tap located at a latch (similar to data taps 558 and latches 552 depicted in FIGS. 8 and 11). Randomness corrector 630 further comprises a pseudo-random number generator (PRNG) 644 and a data clock 646. Upon clocking of data clock 646, SSR 640 is operable to produce an output word 648 containing n bits as an input for PRNG 644. Randomness corrector 630 further comprises a nonlinear combining element 650, which is a parity generator. Parity generator 650 is operable to accept data 633 via input 632 and to accept data 652 from PRNG 644. Randomness corrector 630 is operable so that a single corrected data bit 658 is sampled at data line 659 or an n-bit quasi-random word is sampled at data lines 656.

In some embodiments, a randomness corrector in accordance with the invention is operable to generate one or more bits of output 570, 612, 614, 659 for every input bit at input 542, 632. In accordance with the invention, a data clock 568, 646 is operable to clock a plurality of times for every bit input. For example, if a clock clocks four times for every bit of input, the randomness corrector generates four corrected bits out for each input bit. In such a case, each output bit has about one fourth of the original entropy; that is, the output bit is quasi-random.

In some embodiments, a randomness corrector comprises k number of serial shift registers (SSRs), wherein k≤m (m being the number of selected ADC output lines or other independent sources of random numbers), each shift register having a plurality of latches and a plurality of shift intervals. Furthermore, each shift register includes a plurality of parallel sampling data taps that are relatively prime to each other. Such a randomness corrector includes a nonlinear combining element for each of the k shift registers, the nonlinear combining element being operable to accept data from a selected one of the m ADC output lines, to accept data from a plurality of parallel data taps, to combine the one selected ADC output line and the data from parallel data taps into a corrected output bit, and to input the corrected output bit into an input of the SSR. A data clock is operable to clock data through the randomness corrector.

In some embodiments of a SNDRN in accordance with the invention, an ADC is operable so that the n number of ADC output lines have an aggregate bit rate of n times the sampling frequency of the ADC. In some embodiments, the ADC is operable so that the n number of ADC output lines have an aggregate bit rate greater than one billion bits per second. In some embodiments, m number of randomness correctors are operable so that m number of corrected sequences of bits have an aggregate bit rate greater than one billion bits per second. In some embodiments, m number of randomness correctors are operable so that m number of corrected sequences of bits have an aggregate bit rate greater than six billion bits per second. In some embodiments, m number of randomness correctors are operable so that m number of corrected sequences of bits have an aggregate bit rate greater than twelve billion bits per second.

Randomness correction and randomness correctors are also described in International Publication Number WO 2007/014031, published 1 Feb. 2007, and in U.S. Pat. No. 7,096,242, issued Aug. 22, 2006, to Wilber, which are hereby incorporated by reference.

Figure 12:
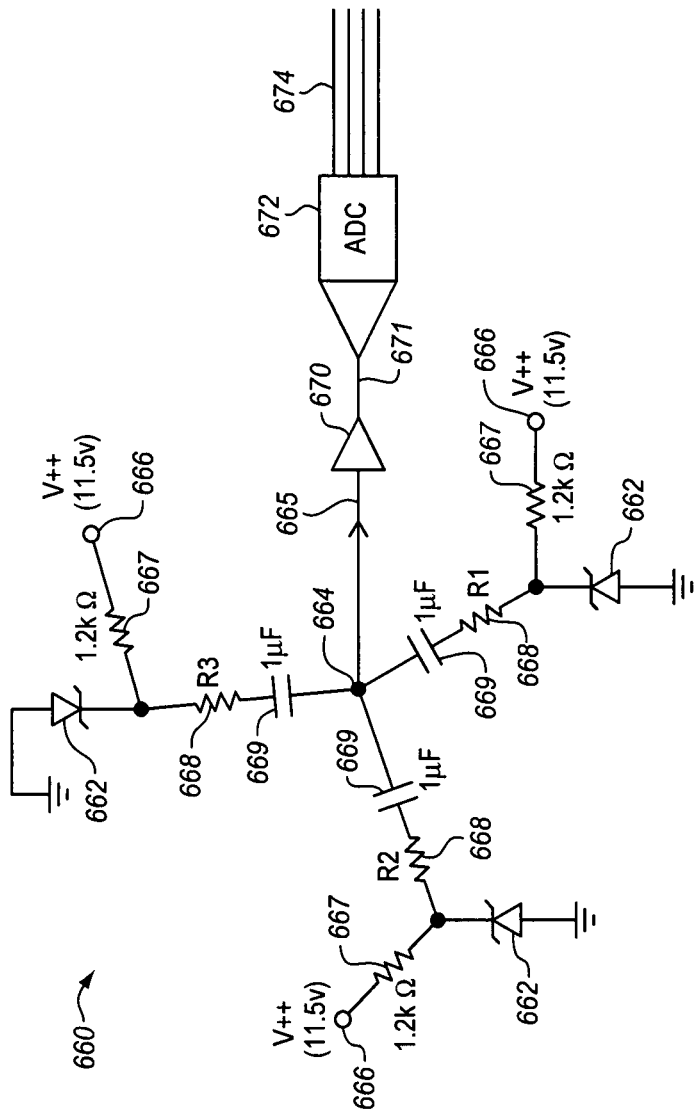
FIG. 12 shows a simplified diagram of a summed multi-source random number source in accordance with the invention having a plurality of independent noise sources of entropy coupled at a summing point.

FIG. 12 shows a simplified block diagram of a summed multisource non-deterministic random number source 660 in accordance with the invention having a plurality of independent entropy sources 662 for generating non-deterministic (true random) noise coupled at a summing point 664 and being operable to generate a signal 665 at the summing point. Examples of independent sources of entropy include: a noise diode, a zener diode, a photodiode, an avalanche diode, a superconductive junction, a resistor and a radiation detector. Some embodiments further comprise a coupler 668 and 669, the coupler being connected to the sources of entropy and being operable to couple the sources of entropy at summing point 664. In some of these embodiments, the coupler is operable to couple the sources of entropy using electromagnetic fields. Examples of a coupler include: a wire, a resistor, a variable resistor, a capacitor, a variable capacitor, an optically controlled resistor, an electronically controlled resistor, a photodiode, a delay line and a controllable delay line.

Summed multisource SNDRN 660 includes bias voltages 666 and bias resistors 667. Exemplary bias resistors have a resistance of 1.2 kilo-ohms (kΩ). Weighting resistors 668 have a resistance in a range of about from zero to 100 ohms. The resistance R1, R2 and R3 of three weighting resistors 668 are different so that noise sources 662 are weighted differently. The three capacitors 669, having a value of about 1 microfarad (μF), serve to decouple the DC components of noise diodes 662 from each other and from the input of amplifier 670. Amplifier 670 is located between summing point 664 and analog to digital converter (ADC) 672 and is operable to amplify signal 665 to signal 671.

ADC 672 has at least one ADC output line 674 and is responsive to the amplified signal 671 to produce non-deterministic random numbers in at least one ADC output line 674. In exemplary embodiments, non-deterministic random numbers produced by summed multisource SNDRN 660 serve as an input to an abstracting processor.

Some embodiments comprise at least three independent sources of non-deterministic random noise and are characterized in that the at least three independent sources of entropy are spatially arranged to form one or more triangles. In some embodiments, the independent sources of entropy are part of a monolithic integrated circuit. In some embodiments, the independent sources of entropy are all contained within a spherical radius of 0.5 mm. In some embodiments, the independent sources of non-deterministic random are coupled to simulate neuronal connections in a brain. In some embodiments, one or more output lines 674 of summed multisource SNDRN 660 are the input of at least one randomness corrector that is operable to process the at least one ADC output line 674.

In some embodiments, a source of non-deterministic random numbers comprises an independent ring oscillator. In some embodiments, a physical source of entropy comprises an independent ring oscillator.

A ring oscillator is formed by connecting an odd number of inverting logic gates in a ring. The frequency of oscillation is proportional to the inverse of the number of logic gates used in the ring.

Figure 13:
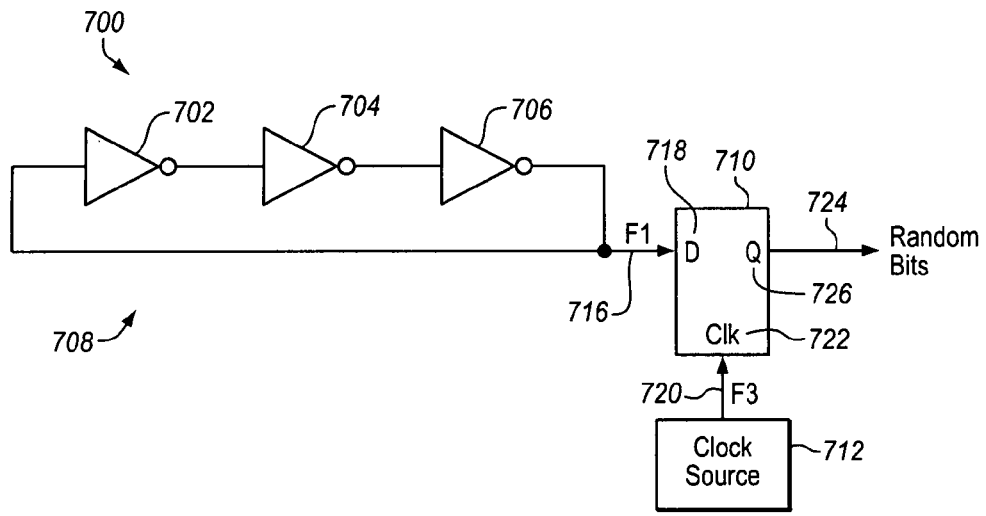
FIG. 13 depicts schematically a simple ring oscillator source of non-deterministic random numbers (SNDRN) in accordance with the invention.

FIG. 13 depicts schematically a simple ring oscillator source of non-deterministic random numbers source (SNDRN) 700. Ring oscillator SNDRN 700 comprises inverting logic gates 702, 704 and 706 connected in a ring 708. Ring oscillator SNDRN 700 further comprises a data latch 710 and a clock source 712. Ring oscillator 708 produces a high-frequency signal (F1) 716, which is applied to the data input 718 of data latch 710. Clock source 712 supplies a clock signal (F3) 720 to the clock input of latch 710. The frequency of clock signal (F3) 720 is lower than high-frequency signal (F1) 716. Random bits 724 are latched out on the Q output 724 of the latch at the clock signal frequency.

The entropy of the random sequence produced by ring oscillator SNDRN 700 depicted in FIG. 13 arises from the analog components that comprise the inverting gates 702, 704 and 706. Noise sources in these components include shot noise and thermal noise, as well as noise induced by power supply variations. The noise sources produce small variations in the timing of the rise and fall of the oscillator signal. These variations are known as transition jitter, or just jitter.

The amount of entropy is related to the root-mean-square (RMS) jitter as a fraction of the ring oscillator period. The jitter in an integrated circuit ring oscillator is only about 1 percent of the oscillator period for oscillator frequencies of several hundred MHz. Therefore, the entropy of a simple ring oscillator SNDRN 700 of FIG. 13 is also small.

Figure 14:
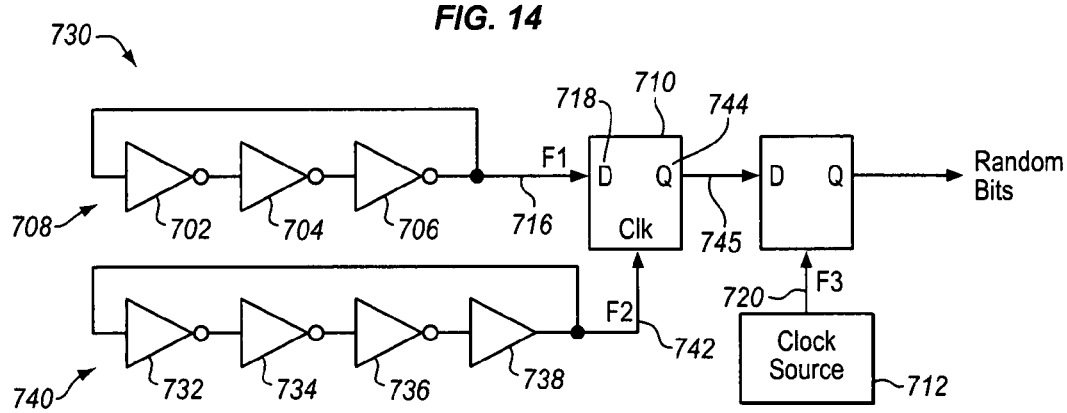
FIG. 14 shows an enhanced ring oscillator SNDRN in accordance with the invention.

FIG. 14 shows an enhanced ring oscillator SNDRN 730. Ring oscillator SNDRN 730 comprises inverting logic gates 702, 704 and 706 connected in a ring 708. Ring 708 produces a high-frequency signal (F1) 716, which is applied to the data input 718 of data latch 710. Ring oscillator SNDRN 730 further comprises inverting logic gates 732, 734 and 736 and non-inverting logic gate 738 in a second ring oscillator, 740. Second ring oscillator 740 produces a high-frequency signal (F2) 742 at a lower frequency than signal 716 (F1). Second ring oscillator 740 supplies a signal 742 (F2) to the clock input of latch 710. The combined jitter of the two ring oscillators 708 and 740 increases the total entropy at output 744 of first latch 710. The output 745 of first latch 710 is in turn latched by a clock signal (F3) 720 of clock source 712 at a frequency lower than either signal F1 or F2. In some embodiments, clock 712 is a system clock so that the random bits produced by the embodiment of ring oscillator SNDRN 730 are synchronized with a specific clock.

In some embodiments, it is desirable that the entropy of the random bits be greater than the entropy of bits produced by a ring oscillator SNDRN 700 or 730. In an anomalous effect detector or a quantum computer in accordance with the invention, good results are obtained with entropy values of at least 0.9 bits per bit, up to 0.99 bits per bit. Entropy values above 0.99 have little incremental benefit. Combined RMS jitter values of 20-30 percent correspond to entropy levels of 0.9-0.99. U.S. Pat. No. 6,862,605, issued Mar. 1, 2005, to Wilber, which is incorporated by reference, teaches a non-deterministic random number generator (i.e., source) comprising software that is operable utilizing only elements usually contained in a general purpose computer, and a general method for calculating entropy using the amount of jitter in various oscillatory signals.

Figure 15:
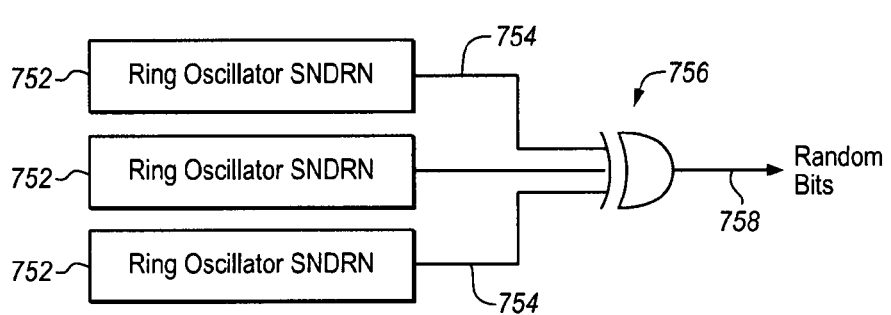
FIG. 15 depicts schematically a non-deterministic random number source system in accordance with the invention comprising a plurality of independent ring oscillator SNDRNs.
Figure 16:
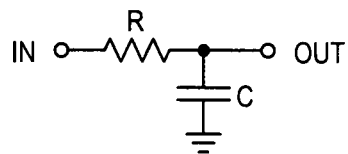
FIG. 16 depicts the simple circuit diagram of the equivalent analog filter of a simple one-pole infinite impulse response (IIR) digital low-pass filter.

FIG. 15 depicts schematically a SNDRN system 750 comprising a plurality of independent ring oscillator SNDRNs 752, all clocked by a common clock source F3 (not shown). The random bits 754 from each of independent SNDRNs 752 are combined in an Exclusive-OR (XOR) gate 756. The output 758 of XOR gate 756 contains entropy from all of the plurality of XOR input bits 754. The number of independent sources 752 combined this way is increased until the final output bits 758 contain the desired entropy.

Filter Design, Noise Bandwidth and RMS Value of Filtered Output

A simple one-pole infinite impulse response (IIR) digital low-pass filter has the following form:

$$y = a_0 \text{IN} - b_1 y_{t-1}, \quad (1)$$

where $a_0 = 1 - e^{-2\pi fc/fs}$ and $b_1 = -e^{-2\pi fc/fs}$, fs is the sampling frequency, and fc is the cut-off (−3 db) frequency, whereby $fc = 1/(2\pi RC)$.

The output is y, and the previous output is $y_{t-1}$. The equivalent analog filter represented by the simple circuit diagram depicted in FIG. 16:

The RMS noise amplitude ($A_n$) for a binary non-deterministic signal is $$A_n = (A_{p\text{-}p}/2)/\sqrt{fs/2},$$

where $A_{p\text{-}p}$ is the peak-to-peak amplitude of the random signal. $A_{p\text{-}p} = 1$ for a binary random sequence of 0's and 1's, and dividing by $\sqrt{fs/2}$, the square root of the Nyquist frequency, yields $A_n$ in terms of noise amplitude per root-Hertz.

The root mean square (RMS) value, $A_{RMS}$, of the binary random signal is $A_{p\text{-}p}/2$. For normally-distributed random signals, the RMS value, $A_{RMS}$, must either be known or calculated from a measurement. As in the binary example, $$A_n = (A_{RMS})/\sqrt{fs/2}.$$

The RMS value of the one-pole low-pass filtered signal is $$A_{filt} = A_n \sqrt{BW},$$

where BW is the effective noise bandwidth of the low-pass filter. For the one-pole filter examples, the effective bandwidth (BW) is:

$$BW = \frac{\pi}{2} fc.$$

Combining these equations yields $$A_{filt} = A_n \sqrt{\pi fc/2} \text{ RMS}.$$

For the example of a binary random signal with output states of +1 and −1, this equation simplifies to:

$$A_{filt} = \sqrt{\pi fc/fs} \text{ RMS}.$$

The same equations apply in the analog domain with slight variations. For a binary signal of 1=+1 volt and 0=−1 volt, the RMS output amplitude of a one-pole low-pass filtered signal is:

$$A_{filt} = \sqrt{\pi fc/fs} \text{ Volts(RMS)},$$

where fc is calculated from R and C, and fs is the rate at which the random value is updated to the filter input. If the filter input signal is Gaussian white noise, it has an RMS noise amplitude that generally must be measured to obtain a precise value. The value will be in units of Volts/$\sqrt{Hz}$. The filter RMS output is obtained by multiplying this value by the effective filter bandwidth, $$\frac{\pi}{2} fc.$$

If the noise signal is not white, that is, if the noise spectrum is not flat, the actual output RMS value typically is determined either by direct measurement of the output, or by integration of the input noise spectrum over the passband of the filter.

In some embodiments, the filtered noise signal is precisely processed through knowing its theoretical distribution and size. The equations provided above yield the expected amplitude of the filter output. The statistical distribution of amplitudes approaches the Gaussian distribution quite closely, even when the filter input is a binary random signal.

The precise probability of the filtered signal being greater than or equal to any particular threshold value is typically calculated from $A_{filt}$ and the threshold value, using the cumulative distribution function (CDF) for the Gaussian distribution.

Artificial Sensory Neuron

Two fundamental types of neurons or nerve cells in the human body are sensory neurons, or sensory nerve cells, and CNS (Central Nervous System) neurons. Sensory neurons receive and pass on physical stimuli from the physical senses. They, in conjunction with the actual receptors of the physical stimuli, provide the means for sensing energies that originate outside the body or CNS. CNS neurons process impulses from sensory neurons and are also involved with the emergence of human consciousness and awareness. It is likely that quantum mechanical properties inherent in the structure of the CNS and other nerve cells, including the neurons and their interconnections in the brain, which makes human awareness possible.

An artificial structure in accordance with the invention responsive to an influence of mind generally includes two properties or parts. One is a physical sensor, which is sensitive to quantum mechanical variations, such as a non-deterministic random number source. The second is an abstracting processor for selectively passing or filtering the signals that indicates the presence of a specific or pre-selected influence of mind.

In accordance with the invention, an artificial sensory neuron (ASN) containing a source of non-deterministic random numbers, takes the place of a biological physical sensor. The term "artificial sensory neuron" as used in this specification is not a precise equivalent of a sensory neuron taught in fields of biology. Viewed in fields of biology, a biological sensory neuron works in conjunction with, and passes on signals from, distinct receptor cells.

Figure 17:
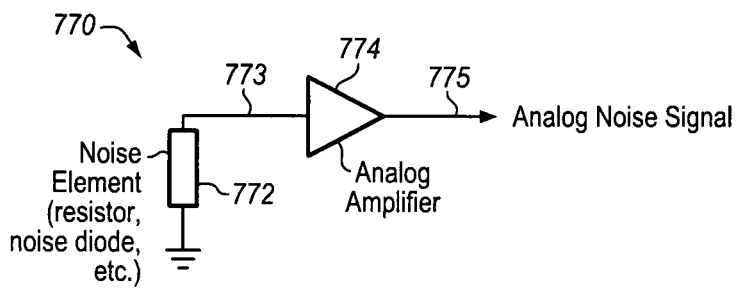
FIG. 17 depicts schematically one type of source of non-deterministic randomness (quantum randomness) comprising an analog or continuous source.

One type of source of non-deterministic randomness comprises an analog or continuous source, as depicted schematically in FIG. 17. Exemplary SNDRN 770 comprises noise element (entropy source) 772, such as a resistor or a noise diode, which produces random analog noise 773. SNDRN 770 further comprises analog amplifier 774, which amplifies random noise 773 to produce analog source numbers 775.

Figure 18:
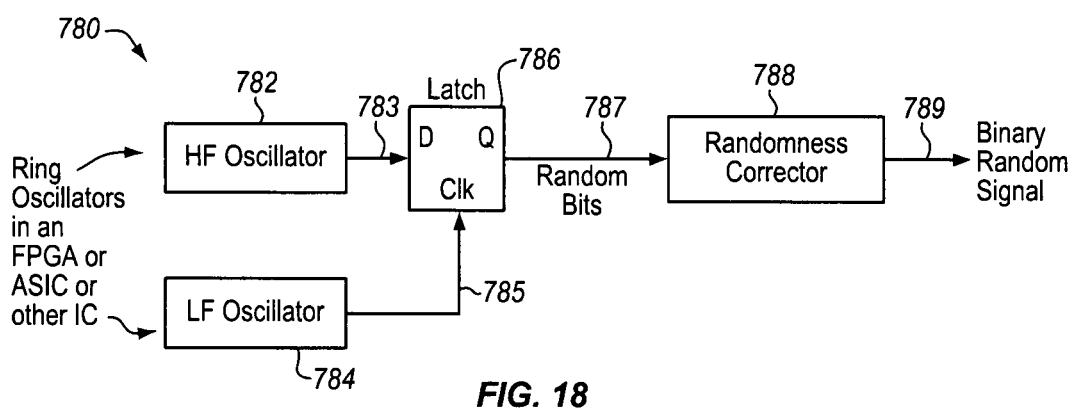
FIG. 18 depicts schematically a type of source of non-deterministic randomness (quantum randomness) comprising a binary source.
Figure 19:
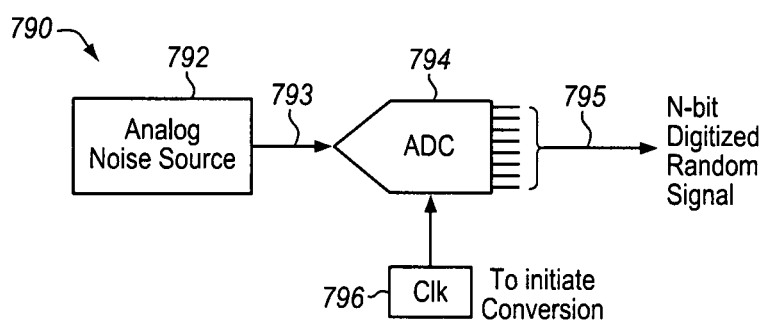
FIG. 19 depicts schematically one type of source of non-deterministic randomness (quantum randomness) comprising a digitized random signal.

Another type of source of non-deterministic random numbers comprises a binary source 780, as depicted schematically in FIG. 18. Exemplary ring oscillator SNDRN 780 comprises HF oscillator 782, which generates a high-frequency oscillatory signal 783 having time jitter in its period, and LF oscillator 784, which generates a low-frequency oscillatory signal 785 having time jitter in its period. Ring oscillator SNDRN 780 further comprises latch 786, which receives oscillatory signals 783 and 785 as input and is operable to produce a stream of binary random bits 787. Ring oscillator SNDRN 780 further comprises randomness corrector 788, which is operable to accept random bits 787 and to correct their randomness (e.g., as described above with reference to FIGS. 7-11) to produce corrected non-deterministic random numbers 789:

Still another type of source of non-deterministic random numbers comprises a digitized random signal, as depicted schematically in FIG. 19. Exemplary SNDRN 790 comprises analog noise source 792, which has an entropy source and an amplifier (as SNDRN 770 in FIG. 17), and which produces random analog noise 793. SNDRN 790 further comprises N-bit analog-to-digital (ADC) converter 794, which is operable to convert random analog noise 793 to N-bit digitized random source numbers 795. Clock 796 serves to clock signal 793 into ADC converter 794.

In some embodiments of the invention, the output of a source of non-deterministic random signals (numbers) is transformed or filtered so that it has a form and statistical characteristics similar to the output of an actual biological sensory neuron. Biological sensory neurons produce a sequence of nearly random pulses of approximately equal amplitude. The statistical distribution of these pulses is approximately exponential; that is, the underlying statistics of the generating process is close to a Poisson process. The Poisson-like process is non-homogeneous, meaning that it is non-stationary, or changes over time. This change appears as an increase or decrease in average pulse rate due to the presence or absence of an external stimulus. In accordance with the invention, several types of sources of non-deterministic random signals naturally produce a Poisson-like process. Examples of Poisson-like processes include: detection of radioactive decay; the arrival of discrete photons on a detector; and the output of a comparator measuring a Gaussian analog signal.

Figure 20:
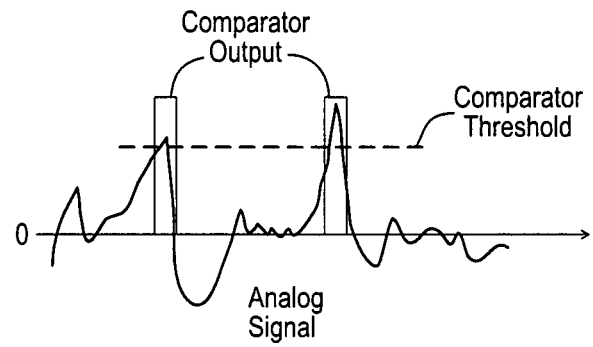
FIG. 20 contains a graph in which comparator output is plotted as a function of analog signal over time.
Figure 21:
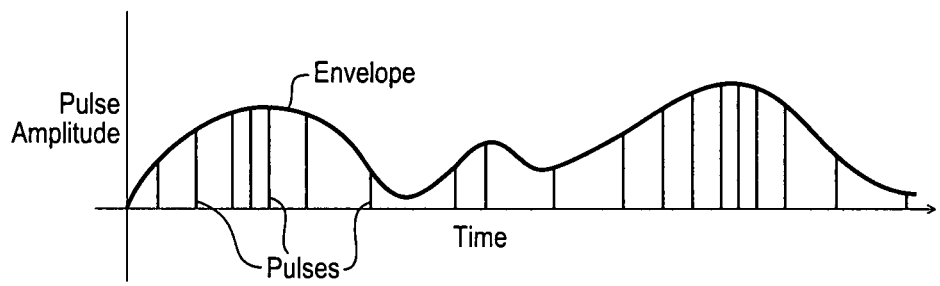
FIG. 21 presents graphically the output of an artificial sensory neuron (ASN) in the form of an envelope or curve fit that approximates the short-term average frequency of pulses.

FIG. 20 contains a graph in which comparator output is plotted as a function of analog signal amplitude over time. As depicted in FIG. 20, only the timing of the leading edge of the comparator is used. This is useful for triggering a constant duration pulse. Also, in a Poisson-like process, there is substantially no autocorrelation between pulses. In order to reduce or eliminate autocorrelation, a certain dead time is imposed between consecutive pulses that are used. For an analog signal that has been filtered by a one-pole low-pass filter, the time constant (TC) of this signal is $1/(2\pi fc)$, where fc is the cutoff frequency. The autocorrelation (AC) of this signal is $e^{-t/TC}$, where t is the time from a measured pulse to the next measured pulse. From these relations, one can calculate the required dead time, td, to achieve a desired maximum autocorrelation $td = -TC \, Ln(AC)$, where "Ln" is the natural log symbol. One skilled in the art of electrical engineering can calculate the filter transfer function and from that the autocorrelation function for more complex filter types. Thus, in some embodiments, a sequence of pulses at random times is used as the output of an ASN. In some embodiments, however, as depicted in FIG. 21, the output of an artificial sensory neuron (ASN) is presented in the form of an envelope or curve fit that approximates the short-term average frequency of the pulses. In some embodiments, it is more expedient simply to use a low-pass filtered sequence of random bits or an analog Gaussian signal to represent an ASN output. Signals of this type are usually easy to produce, especially the filtered random bits. A sequence of binary random bits is probably the most common and simplest to produce.

A form of ASN output that is convenient for processing in digital circuits is a sequence of geometrically distributed random numbers. A geometric distribution arises from the discrete sampling of Bernoulli trials. The discrete form of the exponential distribution is continuous. Digital processing is inherently discrete as the numbers processed are quantized in bits and bytes, and the processing operations are carried out on data produced or sampled at discrete time intervals. An exemplary technique for generating a geometric distribution of random numbers comprises steps of: in a sequence of random bits, taken n-bits at a time, output a "1" (success) when the block of bits equals a fixed pattern, such as all 1's, otherwise output a "0" (failure). This represents a sequence of Bernoulli trials with probability, $p=(½)^N$, where N is the number of bits in the fixed pattern.

Another exemplary technique for generating a geometric distribution of random numbers comprises steps of: in a sequence of digitized random signals, in which the autocorrelation, AC<<1.0, when the digital word exceeds a constant threshold, output a "1", else, output "0".

A variation of these techniques counts the number of samples or trials from one success (a "1") to the next. Two successive counts (A and B) may be converted to a near perfect sequence of binary random bits by a technique such as the following: if count A>count B; output 0; if count B>count A, output a 1; else, no output. This technique works even if there is a significant bias in the original random numbers.

In some embodiments, the statistics of a SNDRN as described in the preceding paragraph are improved by providing a dead time to reduce the influence of autocorrelation in the original sequence. In some embodiments, the statistics are further improved by using independent (non-overlapping) pairs of A and B counts; that is, by not using the ending sample of one count as the beginning sample of the next count. A binary non-deterministic random bit source using an 8-bit A/D converter sampling at 170 MHz can produce a binary sequence at an output bit rate greater than 2 MHz, with both AC and bias having a value less than 20 ppm. Without any randomness correction, a typical high-quality true random number generator produces an uncorrected output with both AC and bias having values greater than the range 100 ppm-1000 ppm. In some embodiments, the amplitude of the input analog signal is adjusted so that its peak-to-peak level is centered and just covers the input range of the ADC; that is, six times the input RMS value equals the ADC input range, ±10-15%, and the analog mean equals one-half (½) the ADC input range.

The design of a processing section for the output of an ASN depends generally on the characteristics of the one or more ASNs that feed into it. In some embodiments, a fully analog processor is operable to receive inputs from several analog ASNs. An exemplary processor useful for processing inputs from analog ASNs comprises essentially an analog artificial neural network (ANN) as known in the art of signal processing.

Figure 22:
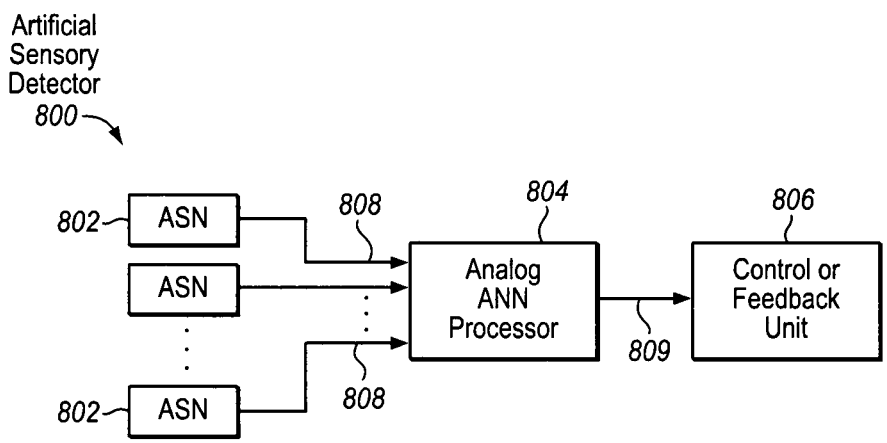
FIG. 22 depicts schematically an artificial sensory detector in accordance with the invention comprising a plurality of artificial sensory neurons, an analog ANN, and a control/feedback unit.

FIG. 22 depicts schematically analog artificial sensory detector (ASD) 800. ASD 800 comprises a plurality of analog artificial sensory neurons (ASNs) 802, an analog ANN 804, and control/feedback unit 806. In accordance with the invention, an analog SNDRN is associated with each of ASNs 802 (e.g., SNDRN 770 containing analog random noise source 772, as depicted in FIG. 17). ASNs 802 are operable to generate analog source signals 808. Typically, ASNs 802 comprise a low-pass filter. In some embodiments of ASD 800, however, ASNs 802 do not include a low-pass or phase-sensitive filter because source signals 808 are already in analog form. Analog ANN processor 804 is operable to receive analog signals 808 from ASNs 802 as input. ANN output 809 is input into control/feedback unit 806. In the brain, neurons are often physically arranged in arrays of triangles in two or three dimensions. A local cluster of neurons is typically constrained to a roughly spherical volume of diameter in a range of about from 0.1 mm to 1.0 mm. This implies a coherence length of about 1.0 mm for the operations of mind and consciousness in the human brain. A type of quantum entanglement or coherence seems to result from the influence of mind in these clusters. Therefore, as well as the size, shape and distribution of clusters of SNDRNs in ASNs 802, the use of SNDRNs that are at least partially entangled in a quantum mechanical sense may increase the efficacy of ASD 800.

Figure 23:
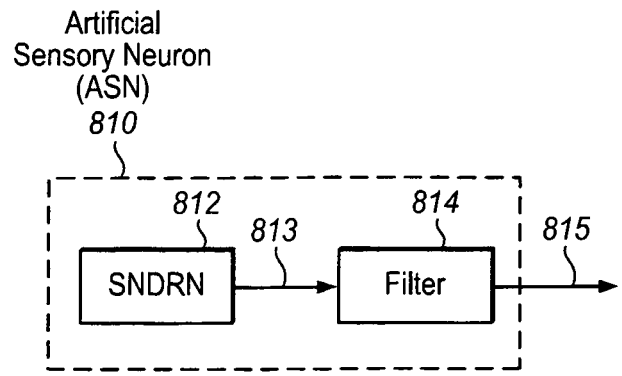
FIG. 23 depicts schematically an artificial sensory neuron (ASN) in accordance with the invention having a SNDRN and a filter.

FIG. 23 depicts schematically artificial sensory neuron (ASN) 810. ASN 810 comprises SNDRN 812, which is operable to generate source numbers 813, and filter 814. Filter 814 comprises a filter selected from the group including a phase-sensitive filter, a complex filter and a low-pass filter. Filter 814 most often comprises a low-pass filter operable to convert digital source numbers to analog source numbers. For example, in some embodiments, source numbers 813 from SNDRN 812 are binary numbers and filter output numbers 815, which are also ASN output numbers, are quasi-continuous digital numbers.

Figure 24:
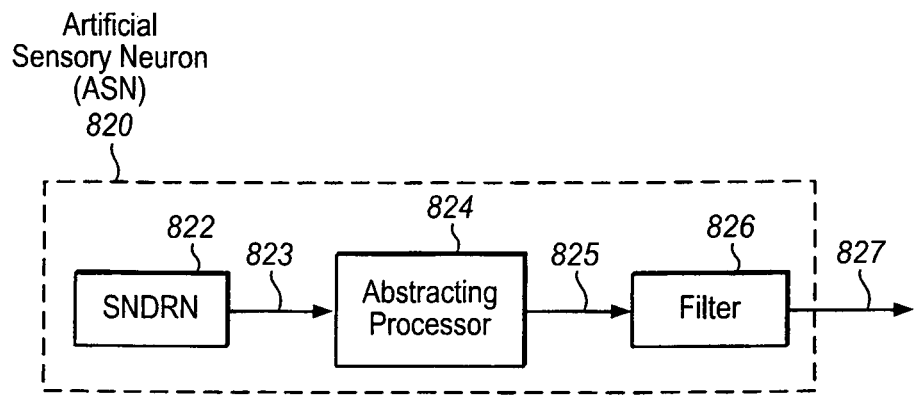
FIG. 24 depicts schematically an artificial sensory neuron (ASN) having a SNDRN, an abstracting processor, and a filter.

FIG. 24 depicts schematically artificial sensory neuron (ASN) 820. ASN 820 comprises SNDRN 822, which is operable to generate source numbers 823, and abstracting processor 824. Typically, SNDRN 822 generates digital non-deterministic random numbers, usually binary numbers. Accordingly, abstracting processor 824 is able to receive and efficiently to abstract source numbers 823 using digital techniques. For example, in some embodiments, abstracting processor 824 is a converter that uses truth tables to abstract source numbers 823. Filter 826 is operable then to filter the abstracted numbers 825 in the output of processor 824. Filter 826 comprises a filter selected from the group including a phase-sensitive filter, a complex filter and a low-pass filter. In some embodiments in which filter 826 is a low-pass filter, filter 826 converts digital (e.g., binary) abstracted numbers 825 to quasi-continuous digital ASN output numbers 827.

In some embodiments, the training of an analog processor containing an analog ANN is accomplished by digital processing, and the resultant tap weights are set by manual adjustment of variable resistors or electronically controllable resistors. If pulses are the output of the one or more ASNs, the pulses received by the ANN are typically either integrated or counted over a selected time interval. This is similar to the way the signals are processed by organic neurons. Counting pulses is a simple way of processing this type of signal in an integrated circuit, although it does not provide the flexibility of a processor with more complex computational power.

The objective of a processor (e.g., a processor 804 comprising an analog ANN) is the detection of subtle patterns appearing in an almost purely random signal. This is done by selectively filtering, combining and abstracting the raw data (e.g., from ASNs 802) to a small number (typically 1 or 2) of outputs that are indicative of mental influence and contain a small amount of noise or randomness not exceeding a selected maximum.

Figure 25:
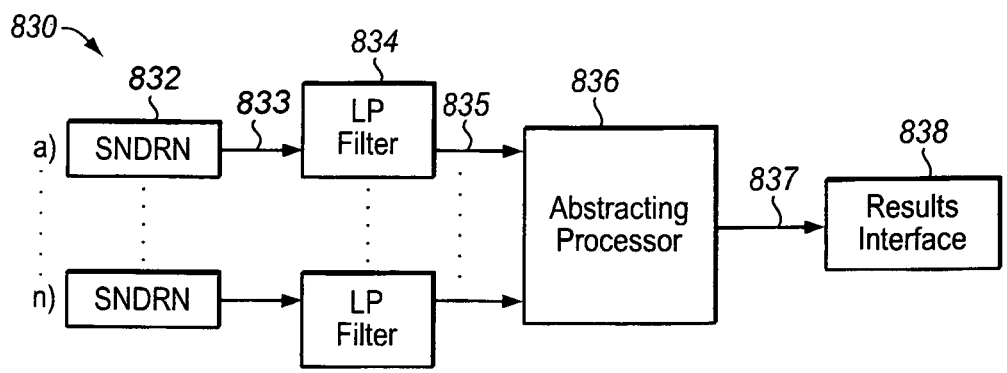
FIG. 25 depicts schematically a generalized anomalous effect detector in accordance with the invention having a plurality of SNDRNs operable to generate a stream of source numbers in the form of binary bits (or alternatively, digital words)

FIG. 25 depicts schematically a generalized anomalous effect detector 830 in accordance with the invention. Anomalous effect detector 830 comprises a plurality of SNDRNs 832 operable to generate a stream of source numbers 833 in the form of binary bits (or alternatively, digital words). Anomalous effect detector 830 further comprises a plurality of low-phase (LP) filters 834. Each of filters 834 is operable to receive source numbers 833 from one of SNDRNS 832 and produce quasi-continuous digital filtered numbers 835. Abstracting processor 836 of detector 830 is operable to receive effectively analog filtered numbers 835, and then to abstract the numbers to enhance a pattern in the numbers associated with an influence of mind. The abstracted output numbers 837 of processor 836 are then fed to results interface 838. The plural combinations of a SNDRN 832 with its associated filter 834 correspond essentially to an effectively analog artificial sensory neuron, such as ASN 802, 810, 820. A preferred embodiment of a processing section and a processing method for processing quasi-continuous data in an anomalous effect detector having a plurality of SNDRNs is described in the following example.

EXAMPLE 3

Figure 26:
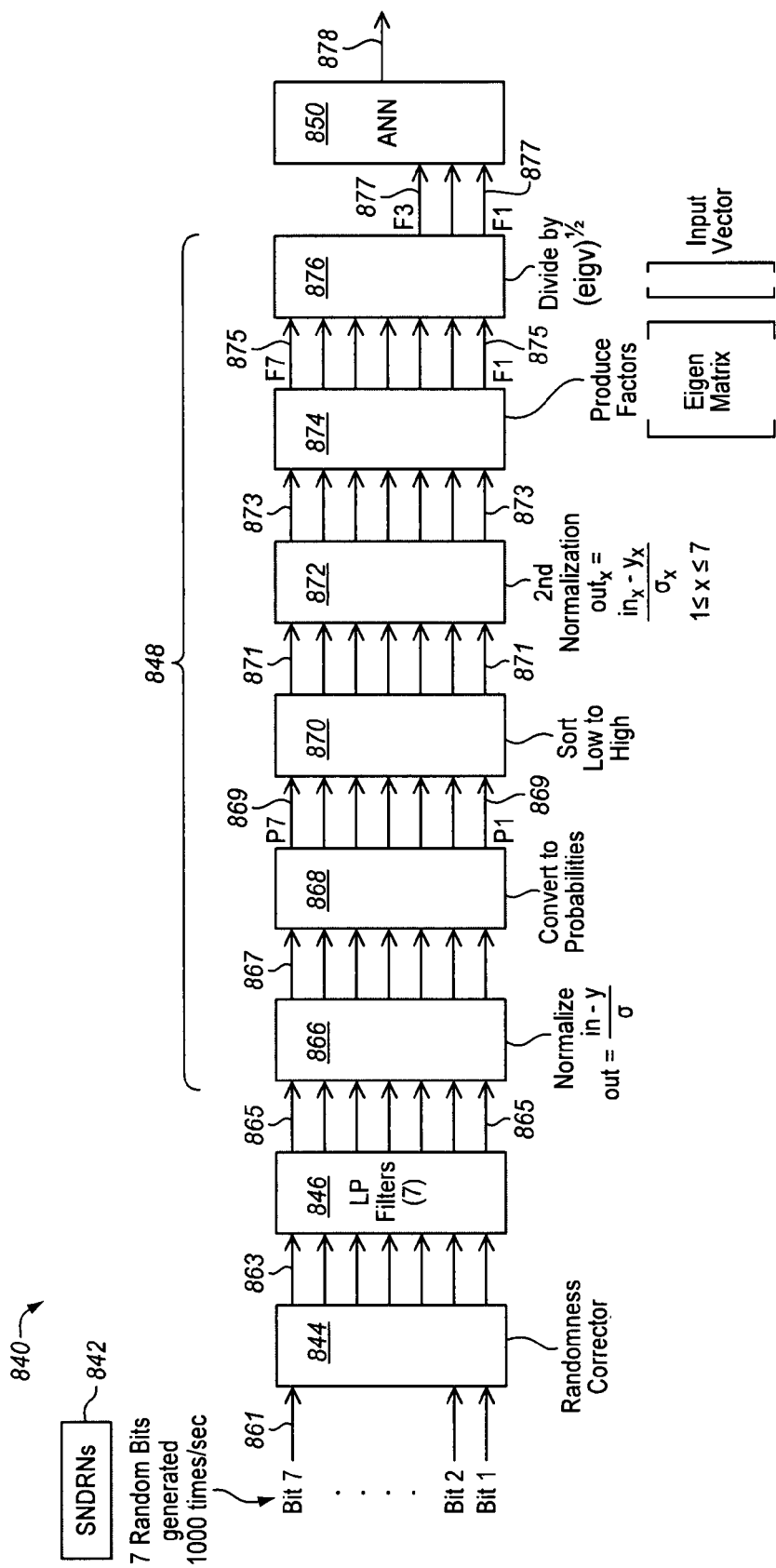
FIG. 26 depicts schematically the principal elements and functional processing steps in a preferred embodiment of an anomalous effect detector in accordance with the invention that is operable to process and to abstract raw data from SNDRNS.

FIG. 26 depicts schematically the principal elements and functional processing steps in preferred embodiment of an anomalous effect detector 840 in accordance with the invention that is operable to process and to abstract raw data from SNDRNS (e.g., from SNDRNS contained in ASNs) to recognize a pattern resulting from an influence of mind. Anomalous effect detector 840 represents essentially a particular embodiment of generalized anomalous effect detector 830 described with reference to FIG. 25, above. Accordingly, among other uses, a system and a method in accordance with those of detector 840 are operable in an artificial sensory detector, ASD. The functional operations embodied in detector 840 were programmed into software and performed using a computer. It is understood, however, that in some embodiments, the same or similar functional processing operations performed in detector 840 are performed using other means and structures, such as one or more programmable microprocessors, FPTAs, analog devices, and combinations thereof.

Anomalous effect detector 840 comprises seven SNDRNs 842, each SNDRN containing a true entropy source (not shown) and a randomness corrector, included in randomness corrector section 844. Detector 840 also comprises seven low-pass filters located in LP Filter section 846. SNDRNs 842 and low-pass filters 846 correspond to artificial sensory neurons having a low-pass filter, such as ASN 810 in FIG. 23. Detector 840 further comprises a group 848 of processing sections used for factor analysis of filtered data from section 846, an ANN 850, and a results interface (not shown) in accordance with the invention.

Each of independent SNDRNs 842 was operated to generate source bits 861 at a selected rate of 1 kilobyte per second (kbps). (Alternatively, in some embodiments, a single source of random bits having a given bit rate is parsed into separate streams; for example, a bit stream from a single source having a bit rate of 7 kbps is parsed into 7 streams at 1 kbps each. For purposes of responding to a mental influence, however, these two variations are not necessarily equivalent. Because of quantum properties of non-locality, it is assumed that the actual physical arrangement or relative orientation of the collection of artificial neurons contributes to the overall responsiveness of the system.)

Each of seven randomness correctors in section 844 is operable to receive a stream of source bits 861 and produce an output of corrected bits 863. Randomness correctors were described above with reference to FIGS. 7-11.

Then, in low-pass (LP) filter section 846, each of the corrected bit streams 863 was low-pass filtered in a separate one-pole digital IIR low-pass filter of the form.

$$out = a_0 IN - b_1 out_{t-1},$$

where the coefficients $a_0$ and $b_1$ were defined with reference to Equation (1), above. The cutoff frequency, fc, was selected to be 6.366 Hz. This yielded a TC of 0.025 seconds. When the output 845 of LP filters 844 was sampled at 5 Hz, the first order AC was $e^{-t/TC} = 0.000335$, a value adequately small for this application. The filter output bits 865 were of the form "1"=+1, "0"=−1. The RMS amplitude of each of the filtered signals 865 was calculated using $A_{RMS} = \sqrt{\pi fc/fs}$, where fs was the sampling frequency, 1.0 kHz. Using the selected values of fc and fs, the value of $A_{RMS}$ was 0.14142, with a mean of $\mu = 0.0$. Each filtered signal was normalized by normalizer 846 of detector 840 by the relation $S_{norm} = (S-\mu)/\sigma$, where σ is the RMS amplitude. The value of p was zero, so dividing by σ, the RMS amplitude or standard deviation produced normalized signals 867 having $\mu = 0.0$ and $\sigma = 1.0$ with a Gaussian distribution (the Gaussian distribution resulting from the low-pass filtering and random input).

The normalized signals 867 were further processed to allow a significant reduction of the amount of input data. This was accomplished by factor analysis, which produced a set of orthogonal output factors from linear combinations of the input numbers 867. The factoring was done on the original normally distributed numbers 867 and, alternatively, on their equivalent probabilities, $0 \leq p \leq 1$, which were calculated from the cumulative distribution function, CDF, of the normal distribution. It was found that the probabilities provided a slightly better compression than the normal numbers, so that form of the number streams was utilized further.

Accordingly, each of the numbers sampled at about 4.3 Hz from the seven filtered and normalized streams 867 was converted to probabilities, $P_1$-$P_7$ by probability converter 868 of detector 840. The resulting numbers 869 were then sorted by sorter 870 into ascending order, and the sorted numbers 871 were normalized again in second normalizer 872. Sorting is an important step, which provides a structure factor that is used in the factoring process. The second normalization also used the equation:

$$S_{norm} = (S_x - \mu_x)/\sigma_x,$$

where x represents the index of the sorted samples, $1 \leq x \leq 7$, and also indicates their corresponding means and standard deviations.

For the seven sorted, normalized uniformly distributed numbers 873 (which the probabilities are), the means, $\mu_1$-$\mu_7$ were $\mu_x = (x+1)/8$, and the standard deviations were measured empirically as $\sigma = (0.11024, 0.114434, 0.161375, 0.166667, 0.161375, 0.114434, 0.11024)$. Next, in factoring module 874, the covariance matrix was calculated from a set of pseudorandomly generated uniform vectors of seven numbers, then sorted and normalized. The covariance matrix was used to calculate the eigenmatrix (or factor weightings) and the eigenvector, eigv. The calculated eigenvector was approximately (4.0, 1.3333, 0.66667, 0.400, 0.26667, 0.1905, 0.14286). The calculation of the eigenmatrix and the eigenvector from a covariance matrix and factor analysis in general are well known in the art of mathematics. The seven factors F1-F7 in output 875 from factoring module 874 were calculated from the dot product, as depicted in FIG. 27. In adjustor 876, the factors F1-F7, were adjusted by dividing them by the square root of the eigenvector. The eigenvector indicated the amount of signal power present in each of the seven factors. The first factor contained about 57% of the total signal power. The first 3 factors accounted for 86% of the total signal power in the seven original inputs 873, demonstrating the efficacy of this method of processing.

In some embodiments, the first factor is used as an output further processing. It is usually desirable, however, to reduce the data and increase the responsiveness as much as possible. This was accomplished in this example by providing two or more of the top (highest energy) factors from output 877 of power normalizer 876 to ANN 850, trained to recognize the patterns in the factors that are correlated with pre-selected mental influences.

Training of ANN 850 was performed, as follows. The first three factors F1-F3 in output 877 of adjustor 876 were selected for training since they contained about 86% of the signal energy. Firstly, the factors, which were normally distributed, were converted to probabilities as described above. The probabilities were uniformly distributed, [0, 1]. This distribution was more compatible with the structure of the ANN. An adequate amount of data for training the ANN was collected, which included four types: target "1" hits, target "0" hits, target "1" misses and target "0" misses. The order of the data was then randomized and an equal amount of each of the four types of data was selected. The total number of data points was limited by the type occurring least frequently. The randomization and the balancing of the data samples were found to be necessary to prevent the network training from converging to a relative minimum, which was not the desired or correct outcome. This was partly because the signal-to-noise ratio (S/N) was relatively small for this data. After the data were selected, randomized and balanced, they were divided into a training set and a test set. The training set was about two-thirds of the data set. Again, this was necessary to ensure that the ANN actually learn the desired patterns. The desired result of the division of the data files was that both training and test sets were balanced, as described above.

After the ANN had been trained, the resultant network of weights was transferred into a runtime version that took real-time data and presented the results for immediate feedback and/or use. The utilization of ANN 850 increased the resulting effect size, ES, (i.e., the responsivity to an influence of mind) by about a factor of three.

Generally, ES=2HR−1, where HR is the hit rate or fraction of hits to total trials. In some embodiments, an ANN is trained to produce a range of outputs between 0 and 1. In some embodiments, a trained ANN produces a slightly biased output. This undesirable condition is correctable by applying good pseudorandom numbers in place of the non-deterministic random signals and adjusting the bias of the ANN output until equal numbers of 1's and 0's are produced.

Numerous variations and combinations of the number and form of the ASNs and also of the processing of ASN-output are within the scope of the invention. In some embodiments, random signals feeding into the front of an ASN are pre-processed by majority voting or bias amplification or other type of abstraction to enhance overall responsivity of the system to an influence of mind. In some embodiments, the number of ASNs is in the hundreds or even thousands. In some embodiments, the rate of measurements is increased relative to the number in Example 3. In some embodiments, ANN output or processor output is majority voted or otherwise processed to produce a final output. In some embodiments, filtering in an ASN is done with a type of filter that produces a phase sensitive output or two orthogonal outputs. Such filters are synchronous filters or detectors, discrete Fourier transforms (DFT's) or fast Fourier transforms (FFT's). In some embodiments, the two outputs of such filters, the real and imaginary parts, are processed in one group. In some embodiments, the two outputs are separated into two groups, a group with all the reals and a group with all the imaginaries. These two groups are then processed separately to produce two independent outputs. In some, embodiments, these two outputs are useful as an x-y control or other application where a 2-dimensional or 2-bit output is needed.

Artificial Consciousness Network

An artificial neural network (ANN) is a computing system that can learn to recognize patterns. ANNs are known. Some artificial neural networks (ANNs) as used in this specification have two or more inputs that receive data with a statistical distribution that is approximately Gaussian or uniform. Other ANNs may have inputs that receive data that approximately follows other known distributions, or does not follow any well-characterized distribution at all. These ANNs have at least one output, and after the ANNs are trained, the signals that appear at their outputs in response to the data applied to their inputs typically produce a statistical distribution that is not predictable or easily mathematically described.

The outputs of the ANNs are often applied to other ANNs or processed in other ways to arrive at a final resulting output. It is desirable to transform the outputs of some of the ANNs to a form that is readily describable by simple mathematical equations. This transformation simplifies the subsequent processing of the ANN outputs, and results in greater accuracy of the final output. The transformation also makes the dynamic range and offset of the intermediate signals more uniform, and therefore more amenable to digital signal processing techniques.

A general approach to transforming an ANN output is to take a large number of outputs produced in response to a number of input data, randomly selected from the same distribution as the data that would be presented during normal operation of the ANN. This is easy if the input data is either Gaussian or uniformly distributed. It is also known in the art of mathematics to produce random numbers drawn "from arbitrary statistical distributions. The resulting outputs from the randomly selected input data are then used to produce an empirical cumulative distribution function (CDF). A curve fitting algorithm is applied to the empirical CDF. The resulting curve fit equation is a function that takes the ANN output data as an input variable and produces a transformed output that is approximately uniformly distributed, with a mean of 0.5 and a range between 0.0 and 1.0.

The following exemplary algorithm is used in this specification to illustrate the approximate numerical conversion between a z-score and the cumulative distribution function (CDF) of the normal or Gaussian distribution. Z-Scores range from minus infinity to plus infinity and the CDF value ranges from 0.0 to 1.0. This type of conversion is referred to as a z-score to probability or "z-to-p" conversion.

Mathematica Program:

```
cdf [z__]:=
  (c1 = 2.506628275; c2 = 0.31938153; c3 = −0.356563782;
  c4 = 1.781477937; c5 = −0.821255978; c6 = 1.330274429;
  c7 = 0.2316419;
  If[z≥0,w = 1,w = −1];
  t = 1.+c7*w*z;
  y = 1./t;
  pz = 0.5+w(0.5−(c2+(c6+c5*t+c4*t^2+c3*t^3)/t^4)/
  (c1*Exp[0.5z^2]t)))
```

A second exemplary algorithm is used in this specification to illustrate the approximate numerical conversion between a probability value from the uniform distribution, and the equivalent z-score in the normal CDF. This conversion is the inverse of the z-to-p conversion and is referred to as a "p-to-z" conversion. These conversions are well known in the art of mathematics.

Mathematica Program:

```
zofp[p__]:=
  (p0  =  −0.322232431088;  p1  =  −1.0;
  p2  =  −0.342242088547;  p3  =  −0.0204231210245;
  p4 = −0.0000453642210148; q0 = 0.099348462606;
  q1 = 0.588581570495; q2 = 0.531103462366; q3 = 0.10353775285;
  q4 = 0.0038560700634;
  If[p<0.5, pp = p, pp = 1.−p];
  y = Sqrt[Log[1/(pp^2)]];
  xp = y+((((y p4+p3)y+p2)y+p1)y+p0)/((((y q4+q3)y+q2)y+q1)y+q0);
  If[p<0.5, xp = −xp]; xp)
```

EXAMPLE 4

ANN output was transformed in accordance with the present invention, as follows. An ANN with three inputs accepted inputs of data with a nearly uniform distribution, as described in Example 3, above. The ANN was trained with a set of training data, as described in Example 3. After training, the ANN was presented with a large set of triples of uniformly distributed random numbers to produce an equal number of outputs. A balanced output was desired; that is, an output having an equal number of output numbers above and below the median value. To achieve this, a trial median value, starting at 0.5, was used to test the output numbers. If more or less of the output numbers were above the trial median value, the median value was adjusted until there were an equal number below and above the final median value. Since the input data was random, the exact value of the required median value was affected by statistical variations. Accuracy of the balance of the output increased with the square root of the number of output numbers used. The number of output numbers used was 100 million or more, to produce an accuracy of about 1 part in 10,000 or better.

It was found that when the input data was uniformly distributed, the output numbers were approximately normally distributed. About 100,000 output numbers were randomly generated. Then, the empirically determined median value was subtracted from each ANN output number. After that, the amplitude of the standard deviation (SD) was adjusted to 1.0 by calculating the SD and dividing all the output numbers by the calculated SD value. The result was a set of numbers with a mean of about 0.0, which mean was approximately equal to the adjusted median, and with a SD of 1.0. These numbers were converted by the z-to-p converter, which resulted in a set of 100,000 numbers that were close to being uniformly distributed. This set of numbers was compiled into an empirical CDF and the domain was adjusted so that the domain spanned from 0.0 to 1.0. The range was already in the range of from 0.0 and 1.0. A polynomial curve fitting algorithm of order about 14 was applied to the CDF. The order of the curve fit required generally depends on how close to linear the empirical CDF is. The accuracy of the curve fit is a statistical variable, so it may be improved by using a larger data set of output numbers for fitting, and also by increasing the order of the fit. To transform the output numbers of the ANN while it was running: the empirically determined median was subtracted from the ANN output; then, the remainder was divided by the calculated SD; the z-to-p conversion algorithm was applied to the quotient; and finally, the product of the conversion was used as the input variable in the polynomial curve fitting equation. The output of this final step was the uniformly distributed equivalent of the ANN output number within a range of from 0.0 to 1.0.

If normally distributed numbers are desired, the uniform transformed output is easily converted using the p-to-z conversion algorithm. Normal numbers are sometimes useful. They are statistically combined simply by adding them together and dividing the sum by the square root of the number of numbers added.

FIGS. 28-31 illustrate the CDFs of the data in Example 4 in various stages of transformation of ANN output. FIG. 28 contains a typical graph of the empirical CDF of unaltered ANN output. FIG. 29 contains a graph of the same data as in the graph of FIG. 28 after normalization; that is, after subtracting the median value and dividing by the calculated SD, which was 0.04775 in this example. The CDF plotted in the graph of FIG. 29 is close to the theoretical CDF for the normal distribution. FIG. 30 contains a typical graph of the CDF after applying the z-to-p conversion. The resulting distribution is nearly uniform, but is still somewhat nonlinear. A $14^{th}$ order polynomial curve fitting equation was applied to the data plotted in the graph of FIG. 30, resulting in the following equation:

$$f(x)=0.00498969+1.98213x-50.3467x^2+999.763x^3-10629.5x^4+69765.1x^5-304701x^6+922785x^7-1979664x^8+3029585x^9-3285675x^{10}+2467108x^{11}-1219982x^{12}+357515x^{13}-47056.9x^{14} \quad (2)$$

FIG. 31 contains a standard graph of the CDF of the f(x) values calculated from the z-to-p data points represented in FIG. 30 using curve-fitted Equation (2). The distribution shown in the graph in FIG. 31 is nearly perfectly uniform. The first order term in the curve fit indicates there is a slight bias in the resulting distribution. This is the result of statistical variations of the data used in the curve fit, as well as the inherent limitation of the curve-fit order. This bias can be removed entirely by subtracting the theoretical mean value of 0.5 from the data before curve fitting and then neglecting the first order term during the curve fitting. During transformation, the 0.5 is subtracted from the z-to-p data before applying the polynomial equation, then 0.5 is added back to the f(x) from the equation. This causes the median value of the ANN output to transform exactly to the theoretical mean value of the uniform distribution, 0.5.

In some embodiments, the responsivity to an influence of mind in the output resulting from processing of signals by ANNs is improved by separately training a plurality of different ANNs on the same or related training files. In some embodiments, the ANNs have different internal structure, that is, different numbers of inputs, hidden nodes and hidden layers. In some embodiments, the ANNs have the same or similar internal structure. The outputs of the separate ANNs are combined in one or more ways, such as, but not limited to: by majority voting; by training a secondary ANN with the outputs of the multiple ANNs as inputs; and by combining the outputs in a statistical combination, such as transforming the outputs to normal numbers, adding them together and dividing by the square root of the number of ANNs used. Such a collection of related ANNs functioning together is referred to herein as a "committee."

In some embodiments, the responsivity or accuracy of a device that responds directly to an influence of mind is improved by using a committee of ANNs in the processing of signals from a source of non-deterministic random numbers, compared to results obtained from using a single ANN. In some embodiments of the present invention, ANNs are trained to detect two different types of patterns in intermediary signals derived from a source of non-deterministic random numbers. One type of pattern corresponds to a polarity or direction, such as a "1" or "0", "up" or "down", "yes" or "no". The other type of pattern corresponds to a "hit" or "miss"; that is, a hit occurs when the current result is correct, and a miss occurs when the current result is incorrect. Thus, this pattern indicates the correctness of the output of the first type of pattern. It has also been found that the magnitude of the ANN outputs contain useful information. This information is easier to interpret when the ANN outputs are transformed; for example, to uniformly distributed numbers. The greater the deviation from the mean (0.5), the greater the likelihood that the indicated result is correct.

In a preferred embodiment of the present invention, a committee of ANNs is trained to recognize patterns relating to an intended direction. The same committee also includes at least one ANN that is trained to respond to hit/miss patterns. The output of the hit/miss ANN is applied to the outputs of the direction ANNs so that they remain unchanged when a "hit" is indicated by the hit/miss ANN, and they are inverted (flipped) around their means when the hit/miss ANN indicates a "miss." In this way, if a "miss" or incorrect result is expected to be produced by the direction ANNs, the results are corrected by inverting them. ANNs trained on the same or similar training data sets sometimes exhibit a degree of correlation. This effect is especially prominent between direction and hit/miss ANNs that used the same training set. A result of this correlation is a significant offset or bias in the final output signal. In some preferred embodiments, the correlation between the hit/miss ANN and the direction ANNs is negative, resulting in a negative bias in the final output. In some embodiments, the bias is reduced or removed by including a copy of the hit/miss ANN with the set of direction ANNs. Since the hit/miss ANN is positively correlated with itself, the amplitude of the hit/miss ANN included with the direction ANNs can be scaled so that its positive biasing effect just cancels the underlying negative bias. This approach is analogous to the stimulatory and inhibitory neurons in the brain. The neurons in the central nervous system (CNS) transmit signals only with positive pulses at variable rates, whereas the electronic or numerical analog in accordance with the present invention has both polarities available, as well as a continuum of amplitudes, to utilize.

EXAMPLE 5

A large number of blocks of binary random numbers, in the form of −1 or +1, were filtered by a first-order low-pass digital filter to produce an equal number of outputs from an ANN committee, as follows. The length of each block was 17 bits, and the number of blocks ranged from about 13 to about 1499, depending on the generation rate of the source of non-deterministic random numbers. The direction of each of the ANN outputs was transformed to a normal number, and then flipped or not flipped as determined by the polarity of the hit/miss ANN output. All the resulting direction ANN outputs, as well as the similarly processed and scaled hit/miss ANN outputs were added together. This sum was finally normalized by dividing by the square-root of the number of ANN outputs used to produce the sum. The normalized number was approximately normally distributed and very close to being balanced, that is, very close to producing an equal number of numbers above and below 0.0. There was still some distortion due to the cross-correlations between the direction ANNs. This output was then transformed into a uniformly distributed output using the same approach used for transforming the individual ANN outputs.

The final uniformly distributed number can be scaled and offset to produce a continuous linear output spanning any range desired. It can also be used in a yes/no-type binary form or divided into a number of smaller ranges that represent integers; for example, equiprobable integers from 0 to 9.

Some embodiments in accordance with the invention use a model more closely resembling the CNS in that they are implemented using only pulses and frequencies of pulses to convey patterns and information. Examples especially include devices that interface directly to biological counterparts in living organisms where the organism has been injured, and devices that enhance the natural performance of an organism. Such devices are useful for directly interfacing artificial limbs to the brain, or for providing a means of remote sensory input directly to the brain. Other examples include implants to restore or enhance sight, hearing, taste, touch or smell.

Artificial consciousness, also known as machine consciousness or synthetic consciousness, is a field related to artificial intelligence and cognitive robotics. The ultimate goal of artificial consciousness is to produce an engineered artifact that exhibits the properties commonly ascribed to consciousness. Today, many practical devices benefit from or are made possible through the application of artificial intelligence. None of these devices are considered to be conscious, and their utility is strictly limited by parameters established by their designers. Artificial consciousness allows devices embodying it to surpass the limitations inherent in their initial design. Also, the devices may evolve, be creative and find solutions to questions and problems not previously considered.

The implementation of artificial consciousness poses a number of difficult engineering challenges. One of these challenges is to provide an engineered structure that has the capability to respond to mind or existing forms of consciousness. International Publication Number WO 2007/014031, published 1 Feb. 2007, as well as this specification, describe embodiments of inventions that respond to mind and existing forms of consciousness. It is believed that the responsivity of an engineered device to consciousness or other mental influences increases as the device more closely approaches the structure and function of the CNS, which includes the brain. It is assumed that the CNS has evolved over hundreds of millions of years to be a highly effective structure for both embodying and responding to mind, including consciousness. Accordingly, the CNS is a useful guide for designing elements in artificially conscious devices responsive to influences of mind.

Figure 32:
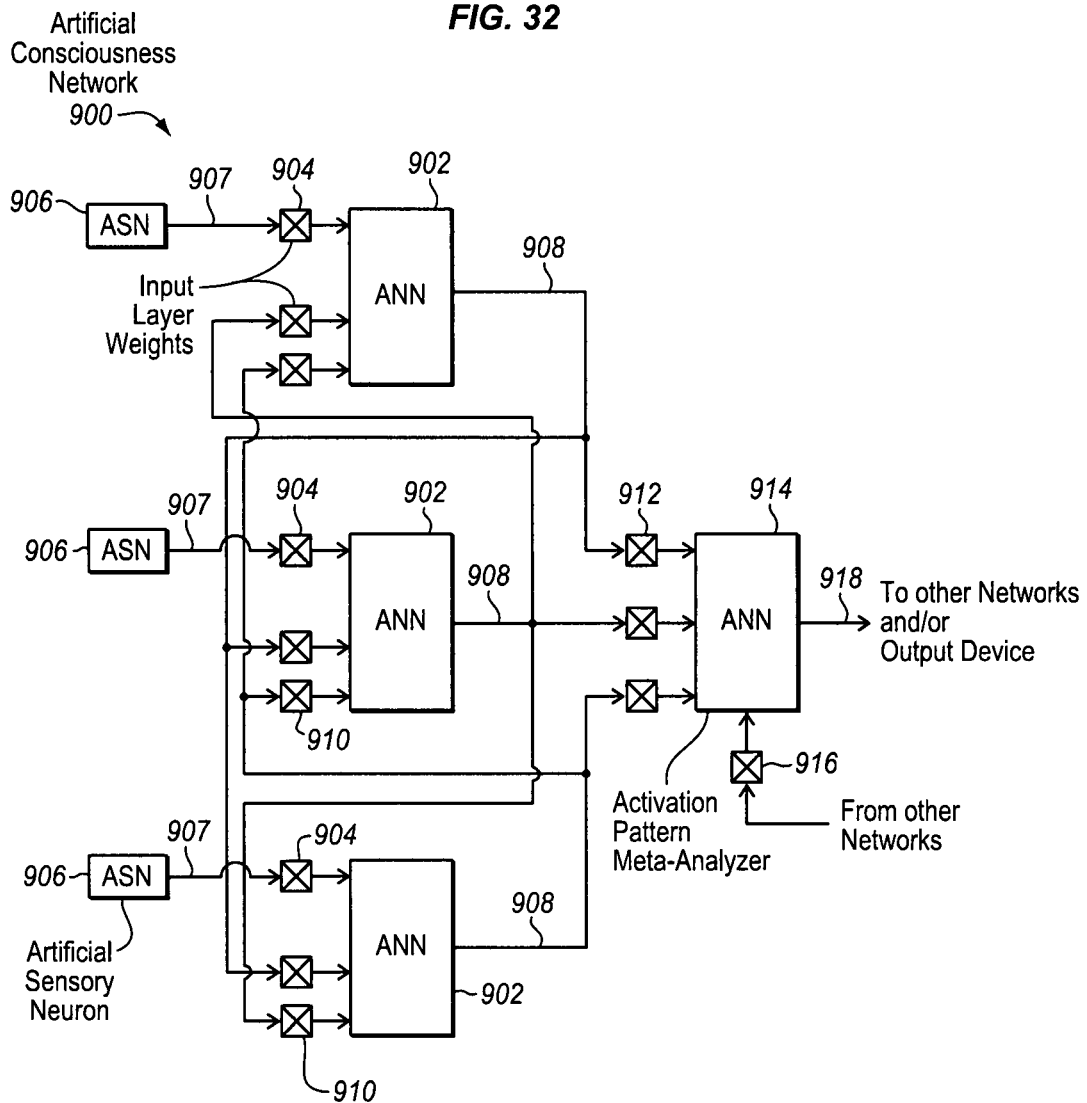
FIG. 32 depicts schematically an exemplary generalized artificial consciousness network (ACN) in accordance with the invention.

Artificial consciousness devices in accordance with the present invention utilize ANN structures as basic building blocks. The ANNs used contain at least an input layer, a hidden layer and an output layer. The ANNs utilize an activation function. In some embodiments, the ANN nodes also include bias inputs. In some embodiments, the outputs of some or all of the ANNs are transformed to uniformly or normally distributed numbers. FIG. 32 depicts schematically exemplary generalized Artificial Consciousness Network (ACN) 900, which responds to mind in a way to become artificially conscious. Several features characterize ACN 900 of FIG. 32.

Each of ANNs 902 in ACN 900 include input layer weights 904. ANNs 902 receive data from an artificial sensory neuron (ASN) 906. ANNs 902 are referred to in this specification as sensory ANNs. An ASN 906 in this specification contains a source of non-deterministic random numbers, SNDRN, which may be of a binary or analog nature. In an ASN 906 in which the SNDRN generates binary numbers, the ASN also contains a low-pass filter (not shown) to filter the numbers and convert them to quasi-continuous digital numbers of known amplitude and spectral content. The statistical distribution of the filtered binary numbers is close to normal. In some embodiments, there is an independent SNDRN in each ASN. In some embodiments, source numbers 907 in the ASN output are distributed from one or more centralized sources. In some embodiments, there is a combination of one or more independent SNDRNs and one or more centralized SNDRNs. In some embodiments, the physical configuration of the SNDRNs influences the functioning of ACN 900. In the brain, neurons are often physically arranged in arrays of triangles in two or three dimensions. A local cluster of neurons is typically constrained to a roughly spherical volume of diameter in a range of about from 0.1 mm to 1.0 mm. This implies a coherence length of about 1.0 mm for the operations of mind and consciousness in the human brain. A type of quantum entanglement or coherence seems to result from the influence of mind in these clusters. Therefore, as well as the size, shape and distribution of clusters of SNDRNs in the ASNs, the use of SNDRNs that are at least partially entangled in a quantum mechanical sense may increase the efficacy of the ACN and reduce the complexity required to embody a particular level of consciousness. Further, some or all of the ANNs 902 in ACN 900 are operable to process signals to detect and to enhance small deviations from predominantly non-deterministic randomness in the signals. An ACN in accordance with the invention comprises two or more sensory ANNs.

The outputs 908 of some or all of sensory ANNs 902 are returned as inputs 910 to some or all of the other sensory ANNs 902 in ACN 900. This provides a feedback network with theoretically infinite recursion. Because of the recursive nature of ACN 900, a settling time constant and associated settling time are associated with any change applied to the ANNs. In an analog embodiment of ACN 900, an appropriate damping factor is established to obtain a stable system. In a digital embodiment, sensory ANNs 902 are quickly cycled a number of times for each new ASN update until the outputs of the ANNs have settled to a desired tolerance.

The outputs 908 of some of the sensory ANNs 902 are connected as inputs 912 to one or more meta-analyzer ANNs

914, that operate to analyze patterns of activation levels, that is, patterns in levels of ANN outputs 908. Accordingly, a meta-analyzer ANN 914 functions as an Activation Pattern Meta-Analyzer (APMA) and is trained to respond to a number of states associated with consciousness (including influences of mind). In some embodiments, the output of one or more other ACNs serves as an input 916 to meta-analyzer ANN 914. A particular manifestation of consciousness is likely to appear as an evolution of states over time within meta-analyzer ANN 914 that appears in output 918. In the human brain, such an evolution may occur over a period of about 0.2 seconds. In some embodiments, therefore, meta-analyzer ANN 914 additionally includes multiple sets of inputs to accommodate the result of multiple sequential time samples to produce a time-evolving output. Alternatively, output 918 of meta-analyzer ANN 914 is sampled multiple times at selected output intervals, and processed by another ANN to produce a desired output.

The degree of complexity of an ACN determines the level of consciousness that is embodied in or through it. Complexity here means the number of ASNs, the number of ANNs and the number of interconnections between the ANNs. Complexity of an ACN also includes factors such as the size, configuration and quantum mechanical entanglement properties of the SNDRNs. Complexity in a small cluster of ANNs is limited by physical size. This limits both the number of interconnections that are squeezed into a small space, as well as the type and number of SNDRNs that fit in or are constructed by available technology. Another limitation is related to the training of the ANNs. Generally, a number of training points or trials are implemented for each interconnection within each ANN. For an ACN, a combination of stored training data with real-time learning trials is generally implemented due to the nature of mind and consciousness and their interaction with matter. Therefore, the training time for the ANNs in an ACN generally increases exponentially with the complexity of the ACN. This is ameliorated by using small groups of ANNs in a local cell of an ACN, and linking a number of these groups into a hierarchy of larger clusters; for example, through ANN output 918 and ANN input 916 of ACN 900. ACN 900 depicted in FIG. 32 is designed to operate independently, but it also has the capability to link to and from other similar devices to build up to a desired level of complexity; for example, through ANN output 918 and ANN input 916.

As mentioned, the training of an ACN comprises a combination of traditional ANN training methods using stored training data and real-time learning trials. Some ANNs may be kept constant after the traditional training, and some ANNs are only initialized by such training, with additional learning conducted in real-time. Recursive interconnections make traditional ANN training difficult, so some ANNs may be trained in a traditional way without recursive interconnections. During real-time learning, the interconnections are in place for some or all of the ANNs in the ACN.

Typically, real-time learning of ANNs is accomplished in a number of ways. A simple way is by evolution using random perturbations. Firstly, the weights in the ANN are initialized with random numbers. A stimulus is presented to the ANN inputs, which is intended to produce a particular desired output. A quality factor (Q) is generated by comparing the closeness of the output to the desired output. The weights are randomly perturbed or shifted a limited amount (the Learning Rate, LR) from their current values, and the stimulus is presented to the ANN again. The present Q is compared to the previous Q. If the present Q is better than the previous Q, the present weights are kept. If the previous Q was better, then the weights are reverted to their former values. This process is repeated until the Q reaches the required value or does not continue to improve within the allotted time. This approach works with almost any linear or nonlinear curve fitting problem, but it has a tendency to be slow. A more advanced method is closer to the commonly known back-propagation method. The ANN weights are initialized with random numbers as before. Then, the partial derivative of each of the weights is calculated with respect to Q. The weights are then adjusted an amount and direction calculated from their partial derivative, the magnitude of Q and the LR. There are many other types of ANNs and training methods that can be used. These other types of ANNs and training methods are well known in the arts of mathematics and signal processing.

An ACN is intended to respond to mind and consciousness, so the types of stimuli and expected responses include those not usually encountered in a classical system. For example, stimuli may be of a mental nature such as focusing on the ACN with a specific mental intention. The intention may include the form of the desired response. Preferably, a means is provided to synchronize the timing of the focused intention with the measured response. In some embodiments, this synchronization is initiated by the one holding the intention (the Operator); for example, by pressing a button. In some embodiments, the timing is triggered automatically at regular or random intervals with a signaling device used to alert the Operator. In some embodiments, the exact form of the response to any particular stimulus is not anticipated in advance. In such a case, the Operator may adjust his expectations interactively with the empirically measured responses.

In some embodiments, an ACN in accordance with the invention also learns to respond to stimuli provided by sensory devices, such as microphones, cameras, pressure sensors and any other sensing device or detector. Signals from these sources are properly conditioned to be compatible to the ANN inputs, and then fed into one or more ANNs in the basic ACN. The ACN module or cluster is then trained to produce a desired set of outputs with a given set of inputs as described above. The output from this type of sensory input ACN module is suitable to be connected to and integrated with a more complex cluster of ACN modules for more abstract interpretation.

Neither the inputs nor the outputs of an ACN in accordance with the invention are limited to non-biological connections. In some embodiments, biological signals, such as nerve impulses, are used to train an ACN to control complex devices such as computers or artificial limbs. In some embodiments, inputs from artificial sensory inputs, such as cameras and microphones, are connected to complex ACNs and trained to provide signals to neurons in the brain that are responsible for seeing and hearing, and in this way, at least partially restoring a lost sense.

Artificial Consciousness Device

FIG. 33 depicts schematically an exemplary generalized artificial consciousness device (ACD) 930 accordance with the invention. ACD 930 optionally comprises one or more sensory input devices 932, which are operable to produce sensory input signals 933. Each sensory input signal 933 is connected to one or more input layer weights (e.g., input layer weight 904 in FIG. 32) of an ANN in an ACN cluster 936. An ASN (e.g., an ASN 906 as depicted in FIG. 32) is operable to send a separate signal (such as signal 907 in FIG. 32) into an input layer weight of each ANN of cluster 936 of ACNs. An exemplary cluster 936 of ACNs is formed by linking a plurality of ACNs, such as a plurality of ACNs similar to ACN 900 (FIG. 32). In an exemplary embodiment, ACN cluster 936 is formed by linking ANN output 918 and ANN input 916 of ACN 900 to other ANNs in other ACNs, as explained above with reference to FIG. 32. The number and complexity of the ACNs in ACN cluster 936 depends on the overall complexity of ACD 930 and the level of consciousness to be embodied. Sensory input devices 932 may include types of sensors that are analogous to our five senses, such as microphones for hearing, cameras for seeing, pressure and temperature sensors for touch, and others. They may include types of inputs that are outside our usual experience; such as connections to computers and keyboards, direct electronic or photonic inputs, chemical analyzers, and electromagnetic receivers outside the visible range. Inputs may also be received from biological measuring devices, such as EEG, EKG and EDR, as well as from direct connection to neural outputs. In some embodiments, sensory input signals 933 are analog. In some embodiments, sensory input signals 933 are digital. Accordingly, in some embodiments, ASNs are analog and abstracting in the ACNs is performed in analog form. More commonly, however, sensory signals 933 are digital or are digitalized and are low-pass filtered to make quasi-continuous digital ASN signals. In some embodiments, ASNs in the ACNs similar to ASN 820 (see FIG. 24) having a digital abstracting processor are utilized. Both digital and analog embodiments of various building blocks of ACN 900 and ACD 930 (e.g., random noise sources, SNDRNs, ANNs) have been described above.

ACN cluster 936 is also operable to generate ACN output signals 937 and send them to one or more output devices 938. Output devices 938 may include auditory and visual outputs, such a speaker and a video display. In some embodiments, output devices 938 include a mechanical device to be controlled, including artificial limbs. One or more ACN outputs 939 may also connect directly to biological neurons 940, such as sensory neurons or other neurons in the CNS. Some output devices may also be integrated with input sensors that connect to the ACN cluster to allow feedback and control loops 941.

In the brain, memory is considered to be associated with enormous numbers of weighted interconnections between neurons. Building an ACD with adequate complexity to implement a significant amount of memory might encounter technological or financial limitations. To alleviate these limitations, an information database and additional expansion memory 942 is connected to ACN cluster 936. The memory elements in the database and additional memory can be common semiconductor RAM and ROM, and may include all forms of electronically or photonically accessible mass storage devices as well. The required complexity and size of the ACN cluster is further reduced by connecting one or more traditional signal processors 944 to ACN cluster 936. Signal processors 944 may include common microprocessors or CPU's, and they may interact directly with their own memory elements, as well as with the sensory input devices 932, output devices 938, information database 942 and ACN cluster 936.

Devices and methods responsive to influences of mind in accordance with the invention are useful in a wide variety of applications. Some embodiments are operable as an information accuracy enhancement device, particularly when the information is not accessible by classical methods. Some embodiments are operable as a predicted information accuracy enhancement device, particularly when the predicted information is not accessible by classical methods. Some embodiments are operable as a communication accuracy enhancement device, particularly when the communication is not accessible by classical methods. Some embodiments are operable to respond directly to an influence of mind. Some embodiments are operable to respond to mental intention in conjunction with a game.

In some embodiments in accordance with the invention, a mental influence detector is portable. Some embodiments further comprise a connection to the internet. In some embodiments, a mental influence detector interfaces to a device, such as a computer or server that is connected to the internet. Functions of a mental influence detector having high processing rates (e.g., on the order of billions of operations per second) are typically in an FPGA or other hardware implementation because of the very high processing rates (too fast to process easily by a computer). Nevertheless, additional truth table processing may be done in a computer before the information is sent over the internet or over phone or a wireless connection to an output device where an operator is located. Any connection to other physiological measurement devices typically is done where the operator is located, but the results may be sent back to a "base" location where the detector is located for further processing and correlation. In some embodiments, the results of this further processing are then sent back to the output device for use by the operator. In other words, in embodiments in accordance with the invention that are internet-based, the several components of an anomalous effect detector or of a quantum computer in accordance with the invention are located separately from each other, sometimes separated by hundreds or thousands of miles.

In some embodiments, the mental influence detector is operable in a combination with a game, and the combination includes a source of a sequence of random binary bits.

Some embodiments in which the mental influence detector is operable in the combination with the game further comprise a connection to the internet.

Certain common features have been observed during hundreds of testing sessions with some embodiments of mental influence detectors in accordance with the invention. In certain applications of a mental effect detector, a lack of attention, drifting or loss of focus typically correspond to a reduction in results. A new operator, or an experienced operator, when significant changes have been made to hardware configuration or processing methods, usually benefits from an initial learning period. After a learning period has passed, results typically follow a pattern of rapid initial rise in the measured influence of mind followed by a peak shortly after the beginning of the session, and then a gradual decline down to some positive basal level substantially lower than the peak. Experienced operators typically maintain the basal level longer and at a higher level than newer operators. Persistence, regularity and motivation to train usually boost the abilities of an operator. These abilities are cumulative over the long term and show persistence in other areas of the operator's life. Certain conditions of the operator may reduce measured mental influence. These include physical discomfort or illness, mental upset or distraction and physical or mental fatigue.

Embodiments of mental influence detectors in accordance with the invention are applicable in various areas of anomalous cognition and machine-enhanced anomalous cognition. These include areas of research into mind, consciousness and reality that are variously referred to as ESP, Psi, Psychic Phenomena, Remote Viewing, Telepathy, Clairvoyance, Clairaudience, Psychokinesis, Precognition, Mental Powers, among other. Some specific areas of utilization include communications, enhanced decision making, medical diagnosis and treatment options, enhanced computing machines, lie detection, enabling the handicapped, locating lost or hidden objects, and increasing correct prediction probabilities for everything from games of "chance" to market moves.

The particular systems, devices and methods described herein are intended to illustrate the functionality and versatility of the invention, but should not be construed to be limited to those particular embodiments. It is evident that those skilled in the art may now make numerous uses and modifications of the specific embodiments described, without departing from the inventive concepts. It is also evident that the steps recited may, in some instances, be performed in a different order, or equivalent structures and processes may be substituted for the structures and processes described. Since certain changes may be made in the above systems and methods without departing from the scope of the invention, it is intended that all subject matter contained in the above description or shown in the accompanying drawings be interpreted as illustrative and not in a limiting sense. Consequently, the invention is to be construed as embracing each and every novel feature and novel combination of features present in or inherently possessed by the systems, devices and methods described in the claims below and by their equivalents.

The invention claimed is:

1. An anomalous effect detector responsive to an influence of mind, comprising:
   a source of non-deterministic random numbers operable to generate source numbers;
   an abstracting processor operable to accept source numbers and to produce abstracted numbers;
   a phase-sensitive filter operable to accept abstracted numbers from said abstracting processor and to produce filter output numbers; and
   a results interface.

2. An anomalous effect detector as in claim 1 wherein:
   said source of non-deterministic random numbers is operable to generate digital source numbers;
   said abstracting processor is operable to accept digital source numbers and to produce digital abstracted numbers; and
   said phase-sensitive filter is operable to accept digital abstracted numbers from said abstracting processor and to produce quasi-continuous digital filter output numbers.

3. An anomalous effect detector responsive to an influence of mind, comprising:
   a source of non-deterministic random numbers operable to generate source numbers;
   a phase-sensitive filter operable to accept source numbers and to produce filter output numbers;
   an abstracting processor operable to accept filter output numbers and to produce abstracted numbers; and
   a results interface.

4. An anomalous effect detector as in claim 3 wherein:
   said source of non-deterministic random numbers is operable to generate digital source numbers;
   said phase-sensitive filter is operable to accept digital source numbers and to produce analog filter output numbers; and
   said abstracting processor is operable to accept analog filter output numbers and to produce analog abstracted numbers.

5. An anomalous effect detector as in claim 4 wherein:
   said abstracting processor comprises an artificial neural network.

6. An anomalous effect detector as in claim 4 wherein:
   said abstracting processor consists essentially of an artificial neural network.

7. An anomalous effect detector as in claim 4 wherein:
   said phase-sensitive filter comprises a complex filter, said complex filter being operable to produce real filter output numbers and imaginary filter output numbers.

8. An anomalous effect detector responsive to an influence of mind, comprising:
   a plurality of sources of non-deterministic random numbers (SNDRNs), each SNDRN operable to generate source numbers;
   a plurality of phase-sensitive filters;
   an abstracting processor; and
   a results interface;
   wherein each of a plurality of said phase-sensitive filters is operable to filter source numbers from one of said SNDRNs and to produce filter output numbers; and
   said abstracting processor is operable to receive filter output numbers from a plurality of said phase-sensitive filters and to produce abstracted numbers; and
   said results interface is operable to use said abstracted numbers.

9. An anomalous effect detector as in claim 8 wherein:
   said abstracting processor comprises an artificial neural network.

10. An anomalous effect detector as in claim 8 wherein:
    said abstracting processor is operable to use a majority voting technique.

11. An anomalous effect detector as in claim 8 wherein:
    a phase-sensitive filter comprises a complex filter, said complex filter being operable to produce real filter output numbers and imaginary filter output numbers.

12. An artificial sensory neuron, comprising:
    a source of non-deterministic random numbers operable to generate source numbers; and
    a filter selected from the group consisting of a phase-sensitive filter and a complex filter.

13. An artificial sensory neuron as in claim 12 wherein:
    said filter is operable to convert digital source numbers to analog source numbers.

14. An artificial sensory neuron as in claim 12, further comprising:
    a low-pass filter.

15. An artificial sensory detector, ASD, responsive to an influence of mind, comprising:
    an artificial sensory neuron, said artificial sensory neuron comprising an analog source of non-deterministic random numbers and a filter selected from the group consisting of a phase-sensitive filter and a complex filter, said artificial sensory neuron being operable to generate analog source numbers; and
    an analog ANN processor, said analog ANN processor being operable to abstract analog source numbers from said artificial sensory neuron to produce abstracted numbers indicative of an influence of mind.

16. An artificial sensory detector as in claim 15, further comprising:
    a control unit, said control unit being operable to provide a control signal.

17. An artificial sensory detector as in claim 15, further comprising:
    a feedback unit, said feedback unit being operable to provide feedback to an operator.

18. An artificial sensory detector as in claim 15, comprising:
    a plurality of ASNs.

19. An artificial sensory detector as in claim 15 wherein:
    a local cluster of ASNs is contained in a spherical volume having a diameter in a range of from 0.1 mm to 1.0 mm.

20. An artificial sensory detector as in claim 15, comprising at least one artificial sensory neuron that comprises a low-pass filter.

21. An artificial consciousness network, ACN, responsive to an influence of mind, comprising:
- an artificial sensory neuron (ASN), said ASN comprising a source of non-deterministic random numbers and a filter selected from the group consisting of a phase-sensitive filter and a complex filter, said ASN being operable to generate source numbers;
- a sensory artificial neural network (sensory ANN), said sensory ANN being operable to process source numbers from an artificial sensory neuron to produce abstracted numbers indicative of an influence of mind; and
- a meta-analyzer artificial neural network (meta-analyzer ANN) comprising an activation pattern meta-analyzer, said meta-analyzer ANN being operable to accept abstracted numbers from a sensory ANN and to respond to a number of specific influences of mind operating on said ACN.

22. An artificial consciousness network as in claim 21 wherein:
- said ASN further comprises a low-pass filter, said low-pass filter being operable to change digital source numbers to quasi-continuous digital source numbers.

23. An artificial consciousness network as in claim 21, comprising:
- a plurality of artificial sensory neurons (ASNs), each ASN comprising a source of non-deterministic random numbers, each artificial sensory neuron being operable to generate source numbers;
- a plurality of sensory ANNs, each sensory ANN being operable to process source numbers from an ASN to produce abstracted numbers indicative of an influence of mind, and
- a meta-analyzer ANN comprising an activation pattern meta-analyzer, said meta-analyzer ANN being operable to accept abstracted numbers from a sensory ANN and to respond to a number of specific influences of mind operating on said ACN.

24. An artificial consciousness network as in claim 23 wherein:
- a local cluster of ASNs is contained in a roughly spherical volume having a diameter in a range of from 0.1 mm to 1.0 mm.

25. An artificial consciousness network as in claim 23 wherein:
- a sensory ANN is operable to accept abstracted numbers from another sensory ANN.

26. An artificial consciousness network as in claim 21, comprising at least one ASN that comprises a low-pass filter.

* * * * *